United States Patent
Christiansen et al.

(10) Patent No.: US 10,647,285 B2
(45) Date of Patent: May 12, 2020

(54) MOUNTING TAB ASSEMBLIES FOR SECURING AN AIRBAG TO A VEHICLE

(71) Applicant: Autoliv ASP, Inc., Ogden, UT (US)

(72) Inventors: Tyler Glen Christiansen, North Ogden, UT (US); Charles Paul Dinsdale, Farr West, UT (US)

(73) Assignee: Autoliv ASP, Inc., Ogden, UT (US)

( * ) Notice: Subject to any disclaimer, the term of this patent is extended or adjusted under 35 U.S.C. 154(b) by 159 days.

(21) Appl. No.: 15/890,190

(22) Filed: Feb. 6, 2018

(65) Prior Publication Data
US 2019/0241144 A1  Aug. 8, 2019

(51) Int. Cl.
*B60R 21/237*  (2006.01)
*B60R 21/232*  (2011.01)
*B60R 21/213*  (2011.01)

(52) U.S. Cl.
CPC .......... *B60R 21/232* (2013.01); *B60R 21/213* (2013.01); *B60R 21/237* (2013.01)

(58) Field of Classification Search
CPC ... B60R 21/232; B60R 21/213; B60R 21/214; B60R 21/201; B60R 21/237; B60R 2021/23192
USPC .......................................... 280/728.2, 730.2
See application file for complete search history.

(56) References Cited

U.S. PATENT DOCUMENTS

2011/0101659 A1* 5/2011 Nogami ................ B60R 21/213
280/730.2

FOREIGN PATENT DOCUMENTS

JP      2014184792 A  * 10/2014

OTHER PUBLICATIONS

PLM: Part Drawing 6274237 006, Autoliv Inc., Released Nov. 4, 2014.

* cited by examiner

*Primary Examiner* — Keith J Frisby
(74) *Attorney, Agent, or Firm* — Stoel Rives LLP

(57) ABSTRACT

Tabs for coupling or securing an airbag to a vehicle are provided. A tab may include a first panel and a second panel that meet at a foldable portion. First and second arms may extend away from a central portion of the first panel in substantially opposite directions. First and second recesses may extend inward from first and second lateral edges, respectively, of the second panel. The tab may be configured to be folded to form a bracket receiving member. The bracket receiving member may be configured to be disposed through an aperture of a bracket to secure the tab to the vehicle. Additionally, the first and second panels of the tab may be configured to be secured to an airbag to secure the airbag to the vehicle via the tab and the bracket.

18 Claims, 15 Drawing Sheets

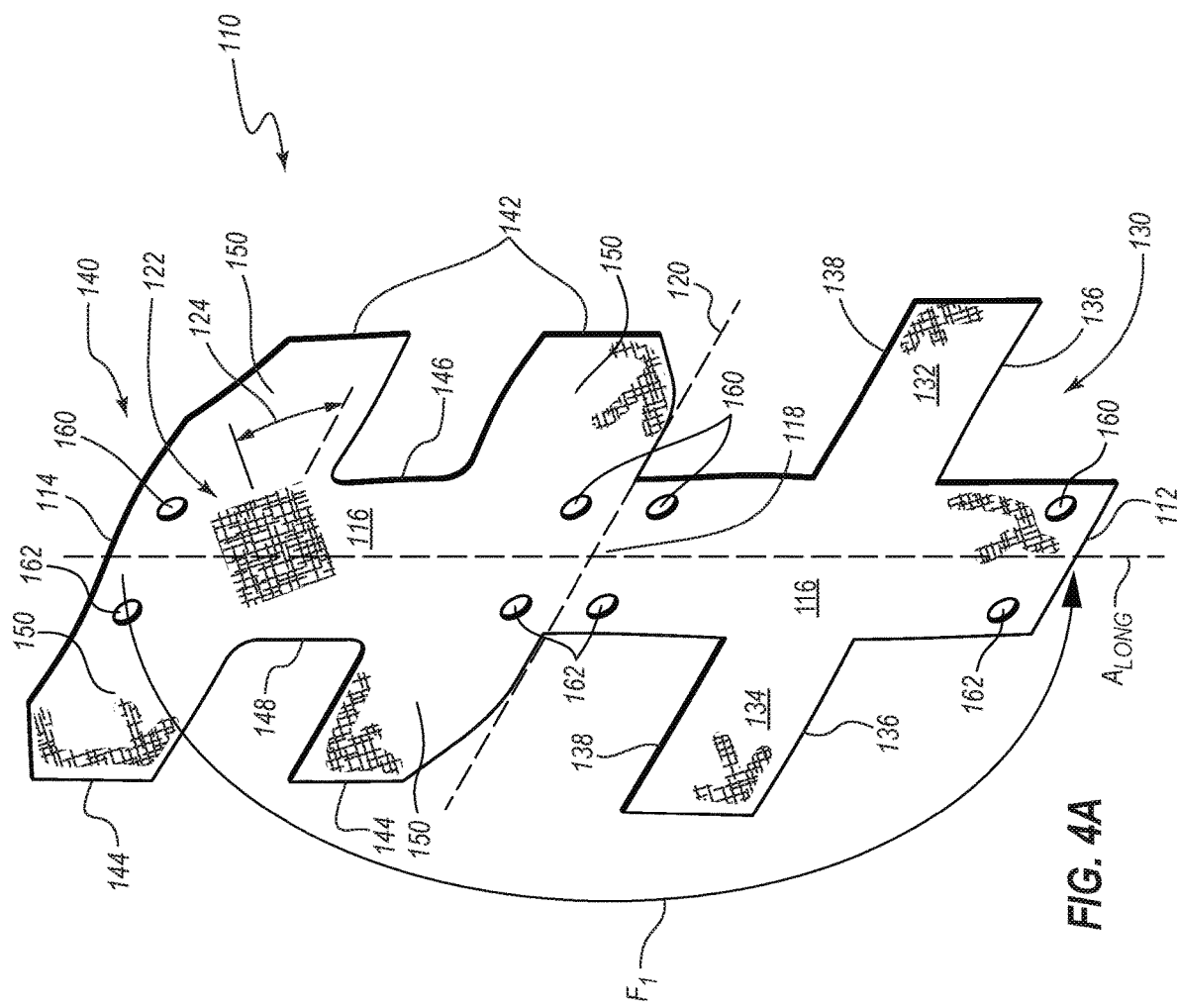

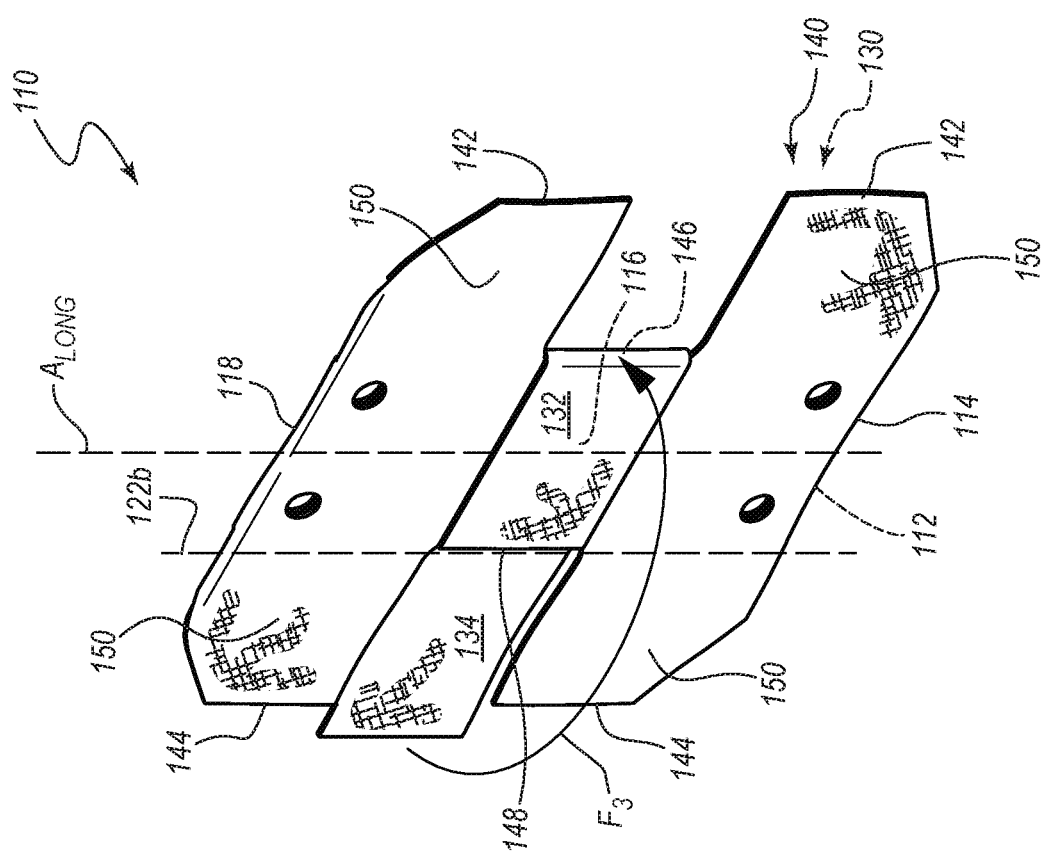
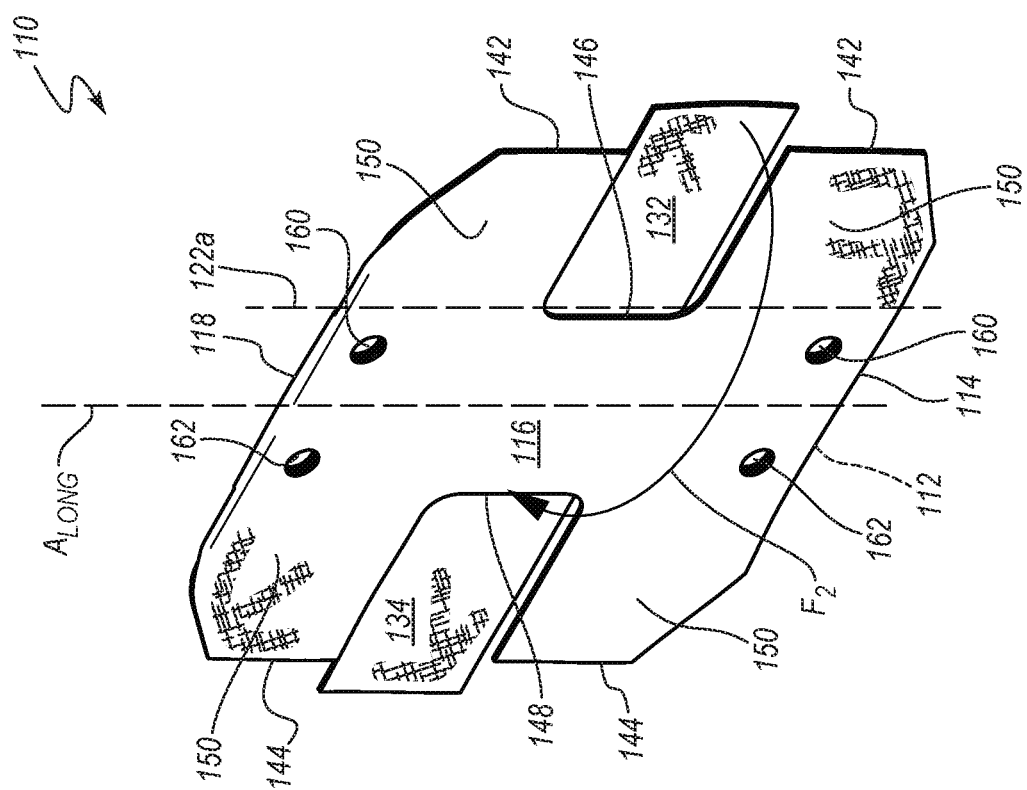
FIG. 4B
FIG. 4C

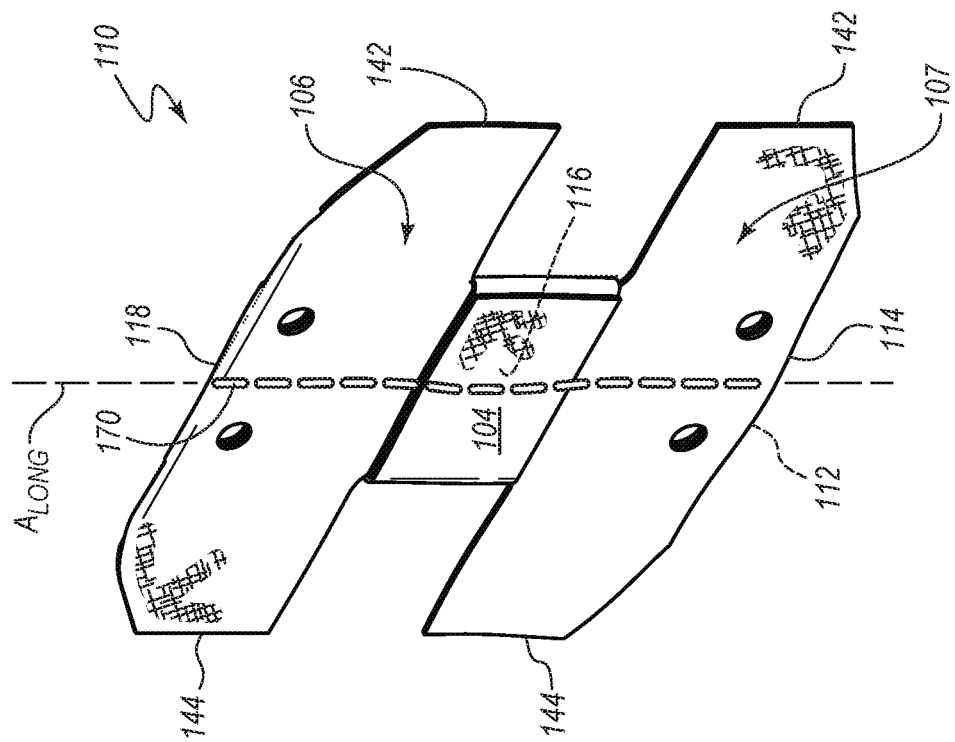
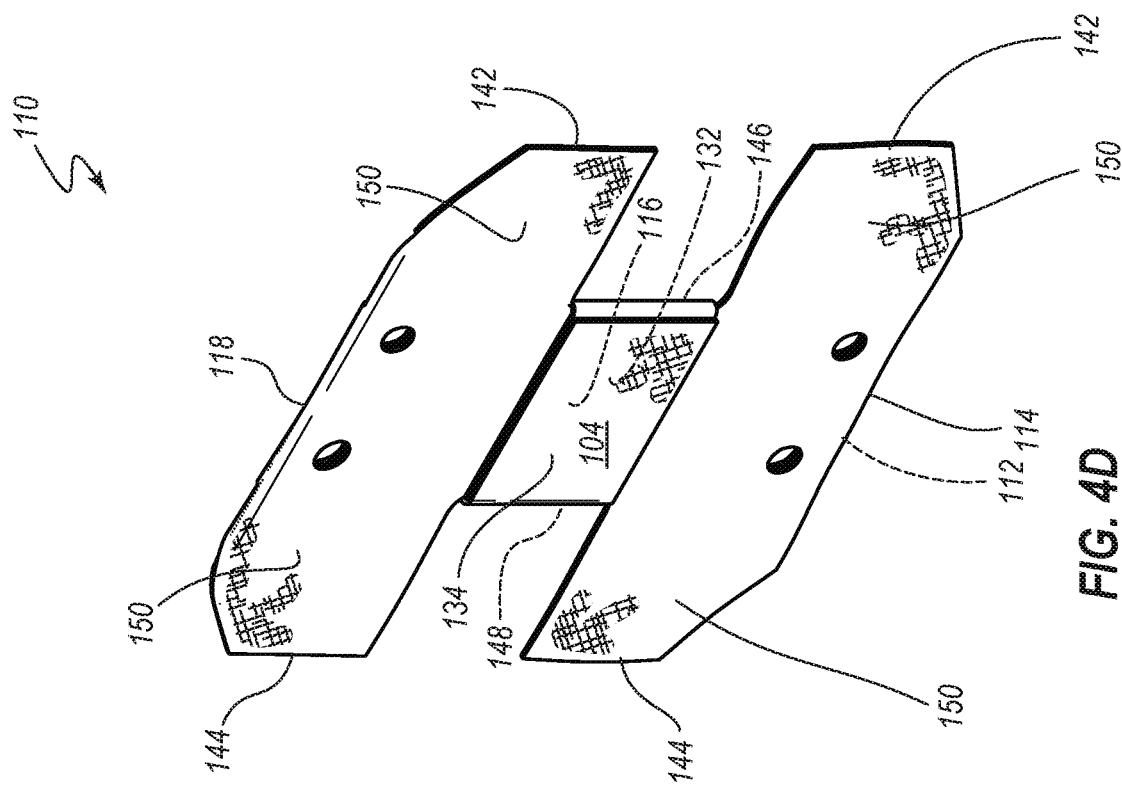
FIG. 4D
FIG. 4E

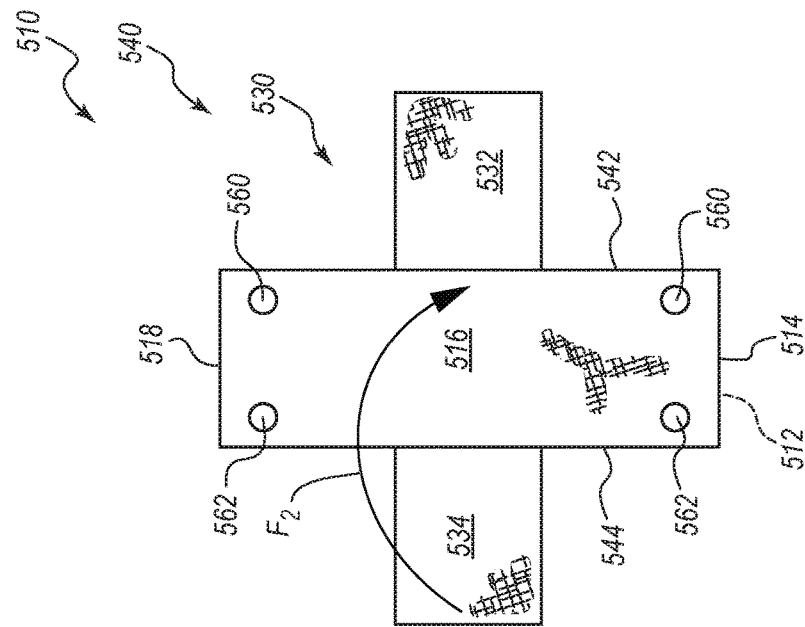
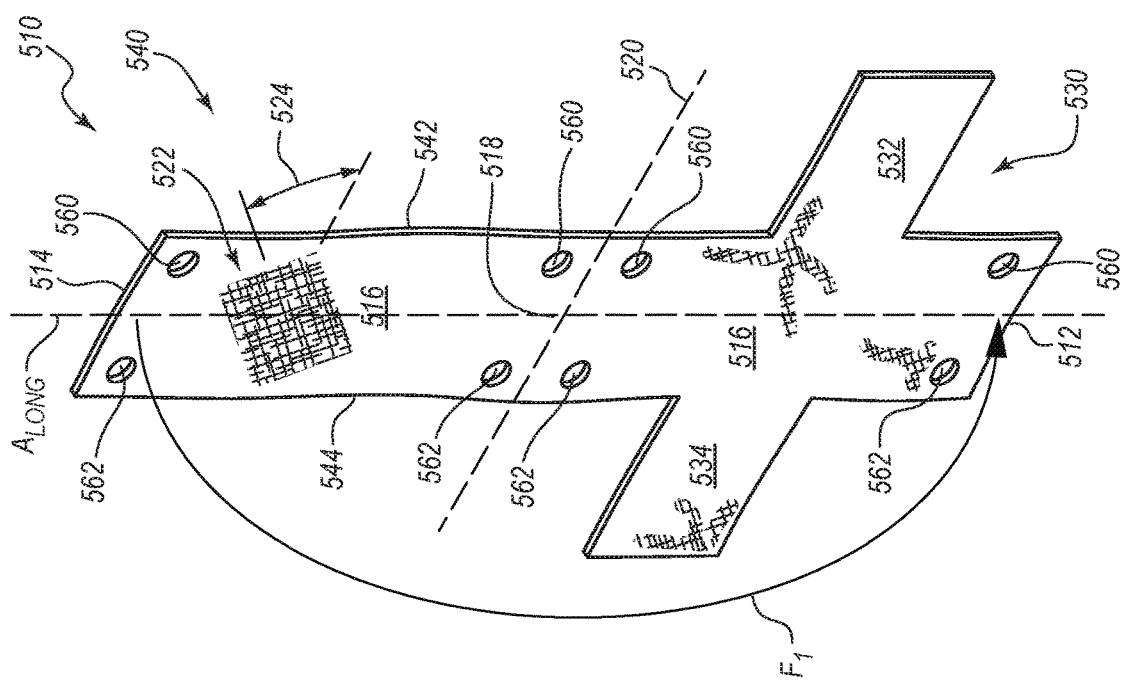
FIG. 5B
FIG. 5A

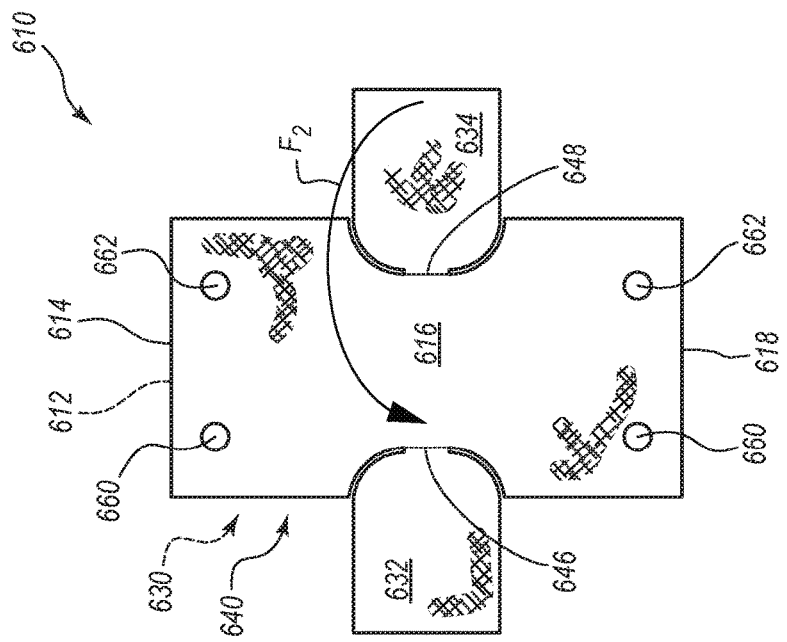
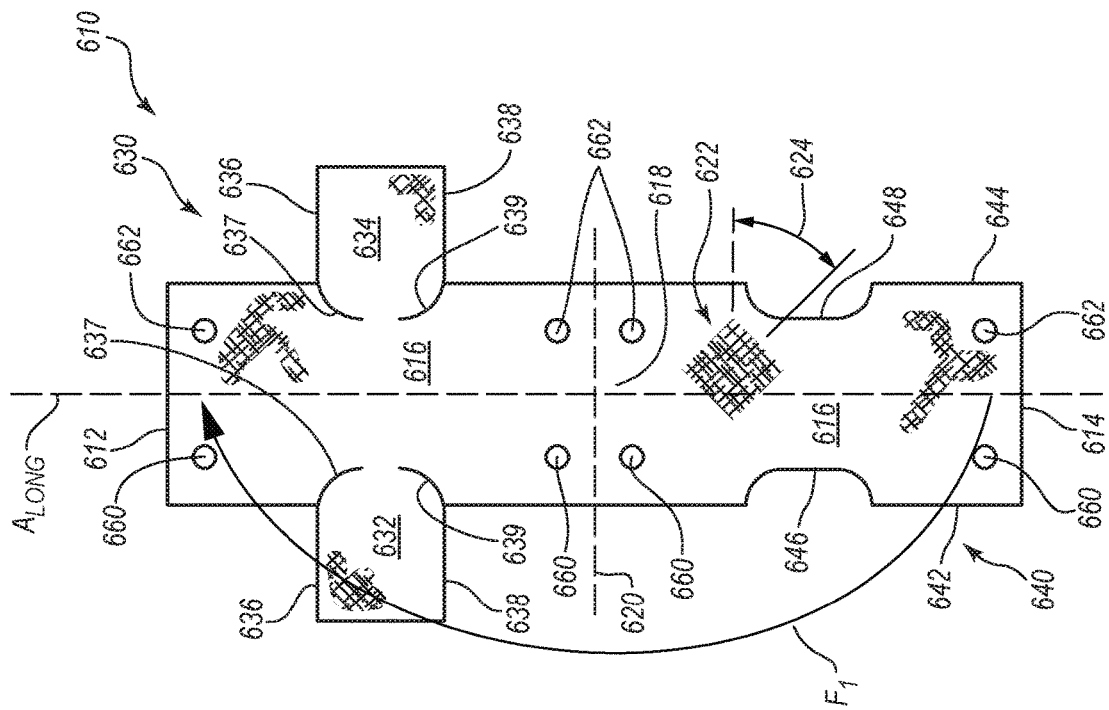

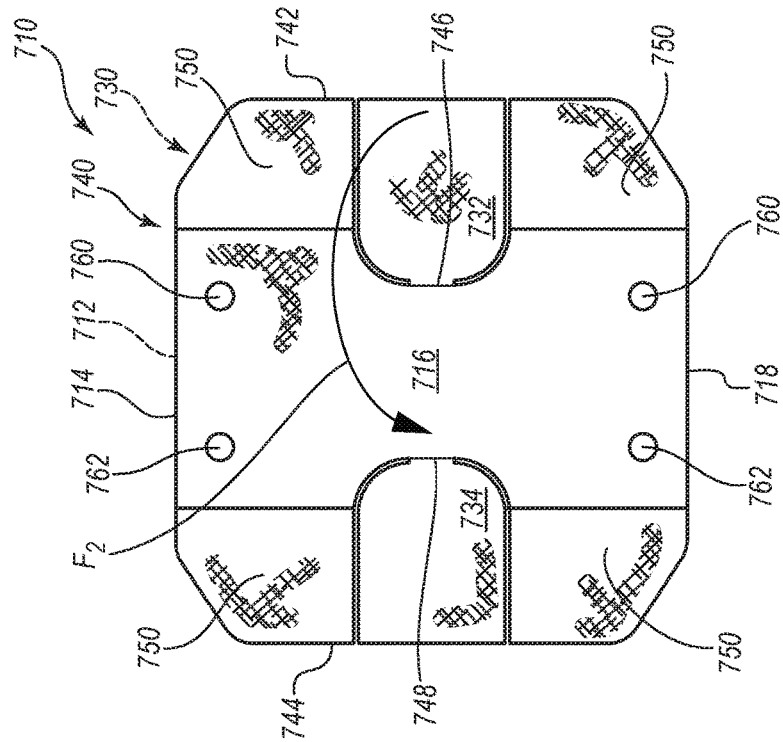
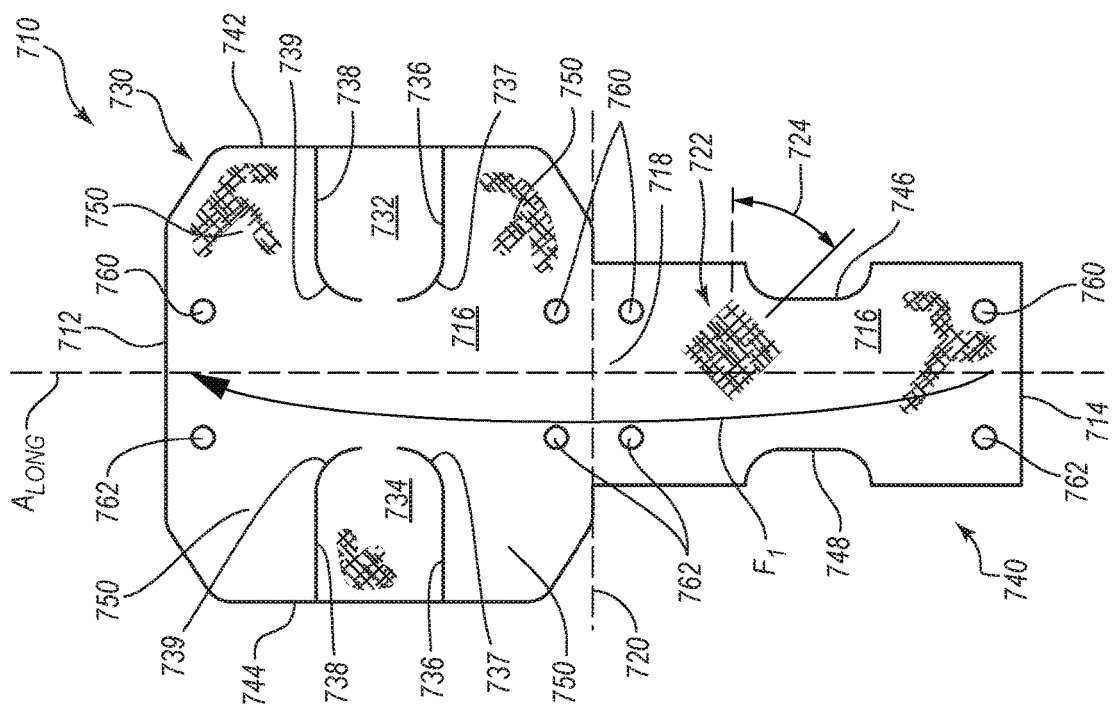

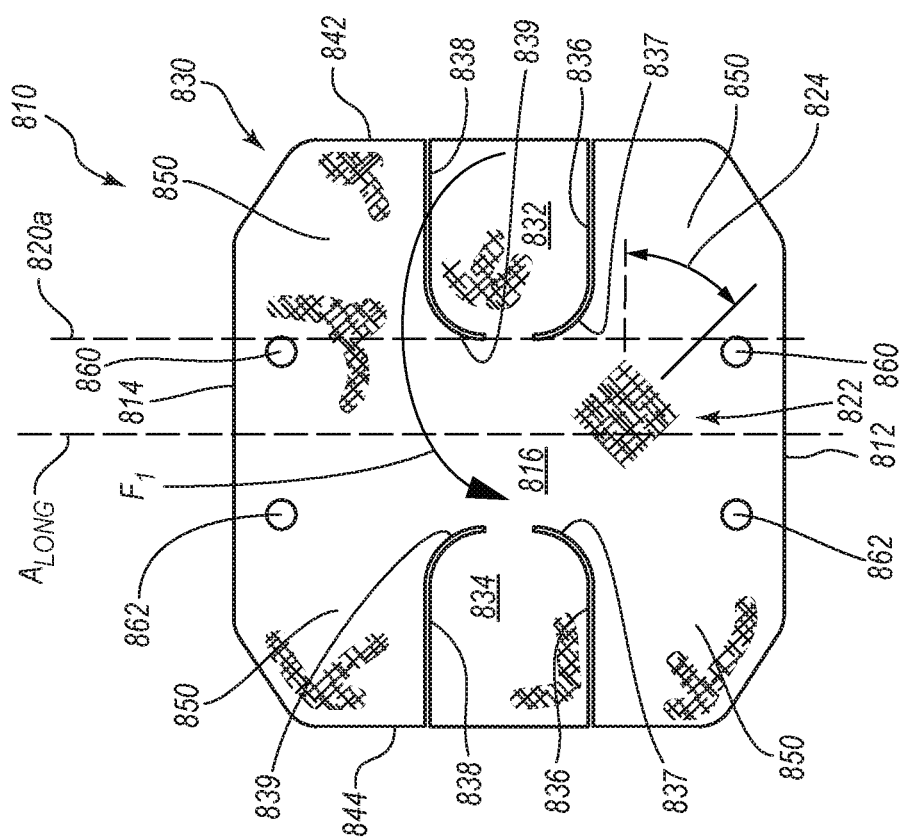

MOUNTING TAB ASSEMBLIES FOR SECURING AN AIRBAG TO A VEHICLE

TECHNICAL FIELD

The present disclosure relates generally to the field of automotive protective systems. More specifically, the present disclosure relates to airbag systems that are configured to deploy in response to collision events.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered limiting of the scope of the disclosure, the embodiments will be described and explained with specificity and detail in reference to the accompanying drawings.

FIG. 4A is a perspective view of the unassembled tab of the mounting tab assembly of FIG. 3A or 3B.

FIG. 4B is a perspective view of the tab of FIG. 4A with the tab having been folded along the fold axis.

FIG. 4C is a perspective view of the tab of FIG. 4A after a second fold has been made.

FIG. 4D is a perspective view of the tab of FIG. 4A after a third fold has been made.

FIG. 4E is a perspective view of the tab of FIG. 4A after three folds have been completed.

FIG. 5A is a perspective view of a tab, according to another embodiment of the present disclosure, in a preassembled state.

FIG. 5B is an overhead plan view of the tab of FIG. 5A with a first fold completed.

FIG. 6A is an overhead plan view of a tab, according to another embodiment of the present disclosure, in a preassembled state.

FIG. 6B is a top plan view of the tab of FIG. 6A with a first fold completed.

FIG. 7A is a top plan view of a tab, according to another embodiment of the present disclosure, in a preassembled state.

FIG. 7B is a top plan view of the tab of FIG. 7A with a first fold completed.

FIG. 8A is a top plan view of a tab, according to another embodiment of the present disclosure, in a preassembled state.

DETAILED DESCRIPTION

Figure 1A:
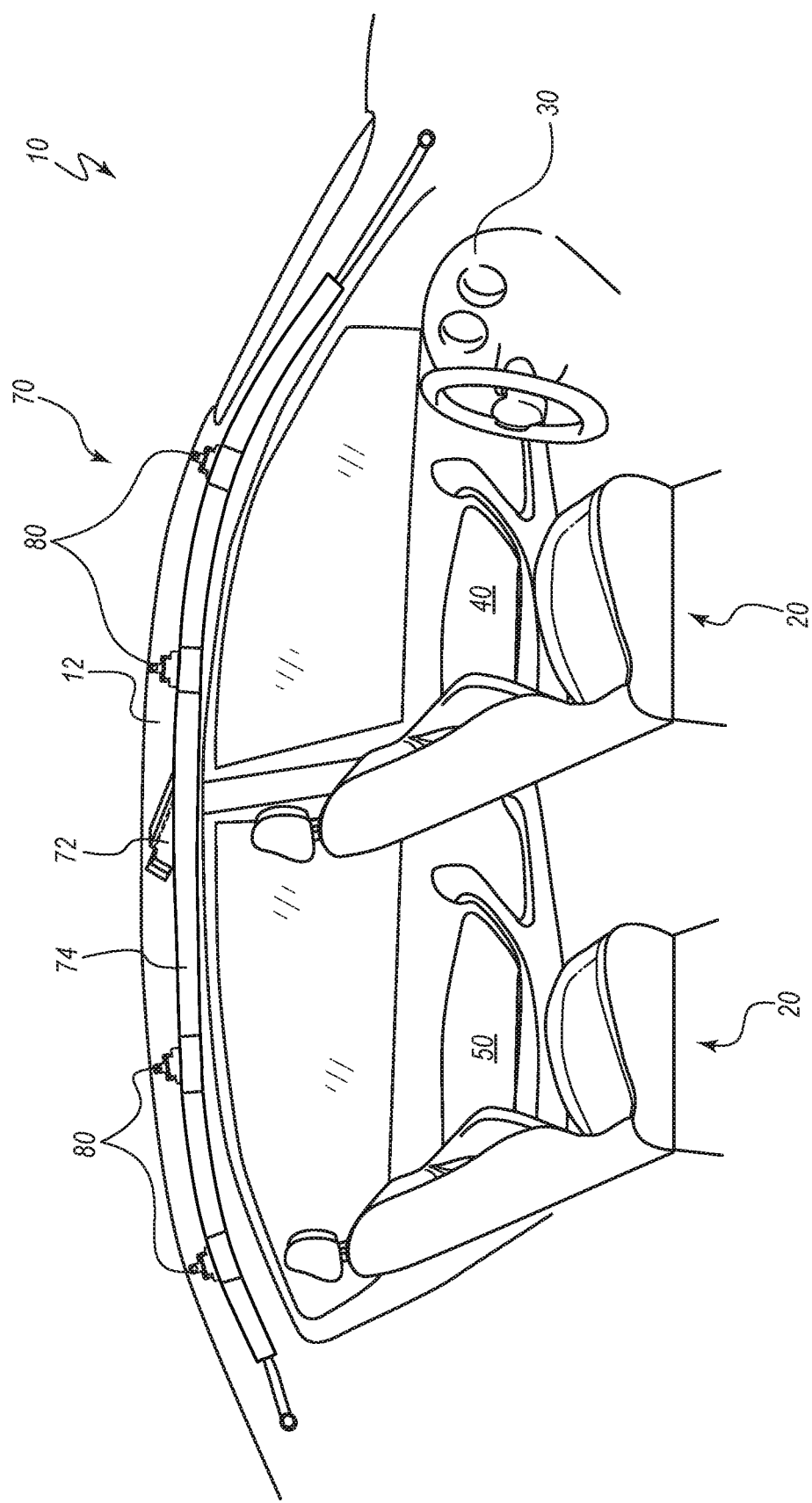
FIG. 1A is a side view of an interior of a vehicle having an inflatable side air curtain assembly, according to one embodiment of the present disclosure, the side air curtain assembly coupled to the roof of the vehicle by one or more brackets.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

Inflatable airbag assemblies are widely used to reduce or minimize occupant injury during a collision event. Airbag modules have been installed at various locations within a vehicle, including, but not limited to, in the steering wheel, in the dashboard and/or instrument panel, within the side doors or side seats, adjacent to a roof rail of the vehicle, in an overhead position, or at the knee or leg position. In the following disclosure, "airbag" generally refers to an inflatable airbag that deploys from an overhead position (or from a position generally over a vehicle occupant position) to protect an occupant during a collision event. An airbag assembly may be mounted to a vehicle using one or more mounting tab assemblies. The disclosed mounting tab assemblies and tab embodiments may be utilized in conjunction with airbags, such as, for example, a front passenger airbag that is typically housed within the dashboard, driver airbags housed within the steering wheel, knee airbags, and side airbags. The disclosed mounting tab assemblies may also be used in conjunction with one or more of the rear seats of a vehicle (e.g., in an overhead position such as in a seat- or roof-mounted configuration). Further, the disclosed mounting tab assemblies may be used in an autonomous vehicle (e.g., in a vehicle that may not have a steering wheel and/or that may have limited, or no, reaction surface such as an instrument panel).

As used herein, the terms "dashboard" and "instrument panel" refer to a protruding region of a vehicle faced by a motor vehicle occupant, which often includes a glove compartment in a portion thereof that faces a passenger and may include instruments (e.g., radio and/or climate controls) in a more central region thereof, although such instruments need not be present.

The term "opposite" is a relational term used herein to refer to a placement of a particular feature or component in a position corresponding to another related feature or component wherein the corresponding features or components are positionally juxtaposed to each other. By way of example, a person's right hand is opposite the person's left hand.

During installation, airbags are typically disposed at an interior of a housing in a packaged state (e.g., are rolled, folded, and/or otherwise compressed) or a compact configuration and may be retained in the packaged state behind a cover. The disclosed mounting tab assemblies may reduce the volume of an airbag assembly when compacted and packaged for installation to a vehicle. During a collision event, an inflator is triggered, which rapidly fills the airbag with inflation gas. The airbag can rapidly transition from a packaged state (e.g., a compact configuration) to a deployed state or an expanded configuration. For example, the expanding airbag can open an airbag cover (e.g., by tearing through a burst seam or opening a door-like structure) to exit the housing. The inflator may be triggered by any suitable device or system, and the triggering may be in response to and/or influenced by one or more vehicle sensors.

Some embodiments of mounting tab assemblies that are disclosed herein are configured for airbag assemblies intended to cushion a front-seat passenger, and may be mounted in a roof of a vehicle, or in a structure above an occupant seating position, or within a seat-back portion of an occupant seat. An airbag assembly can mitigate injury to an occupant of a vehicle during a collision event by reducing the effect of impact of the occupant against structures (body-structure impact) within the vehicle (such as, e.g., a dashboard or door column). The disclosed mounting tab assemblies assist in injury mitigation by disposing and positioning airbag assemblies during a collision event, and by transferring at least some of the energies generated by an occupant impact on an airbag cushion to the vehicle.

Some embodiments disclosed herein can provide improved positioning, cushioning, and/or safety to occupants involved in particular types of collisions. For example, some embodiments can be configured to cushion a vehicle driver and/or front-seat passengers seated adjacent the passenger-side door. Examples of types of collisions in which certain embodiments may prove advantageous include one or more of (1) collisions where the struck object fails to engage the structural longitudinal components and/or engine block of the occupant's vehicle, (2) collisions where the impact forces act primarily outside of either the left or right longitudinal beams of the occupant's vehicle, (3) collisions classified under the Collision Deformation Classification scheme as FLEE or FREE, (4) front-impact collisions where the occupant's vehicle strikes no more than 25% of the vehicle width, (5) collisions as specified for the Insurance Institute for Highway Safety (IIHS) small overlap frontal crash test, or (6) collisions as specified for the National Highway Traffic Safety Administration (NHTSA) oblique impact test. The conditions for the IIHS small overlap front crash test and the NHTSA oblique impact test are disclosed in the Insurance Institute for Highway Safety, Small Overlap Frontal Crashworthiness Evaluation Crash Test Protocol (Version II) (December 2012); and Saunders, J., Craig, M., and Parent, D., Moving Deformable Barrier Test Procedure for Evaluating Small Overlap/Oblique Crashes, SAE Int. J. Commer. Veh. 5(1):172-195 (2012). As used herein, the term "oblique" when used to describe a collision (crash, impact, etc.) is intended to encompass any of the foregoing described collisions and any other collisions in which an occupant's direction of travel as a result of the impact includes both a forward direction or component and a lateral direction or component. In the present disclosure, the longitudinal component of an occupant's post-collision trajectory during or after an oblique collision may be oriented in the car-forward direction.

FIG. 1A is a side view of an interior of a vehicle 10 equipped with an inflatable side air curtain assembly 70, the side air curtain assembly 70 coupled to the roof 12 of the vehicle 10 by one or more brackets 80. Although the side air curtain assembly 70 is shown, embodiments of the disclosure herein may be suitable for other types of airbag assemblies. Shown for reference are two vehicle occupant positions 20, an instrument panel 30, a front door 40, and a rear door 50. FIG. 1A depicts the vehicle 10 having at least four vehicle occupant positions 20 and four doors 40, 50; however, the embodiments disclosed herein may be suitable for other vehicle configurations.

The inflatable side air curtain assembly 70 can include an inflator 72 and an inflatable airbag curtain 74. The side air curtain assembly 70 can be coupled to the roof 12 of the vehicle 10 by one or more brackets 80. In some embodiments, the brackets 80 may aid in disposing the side air curtain assembly 70 in a compactly packaged stored configuration.

Figure 1B:
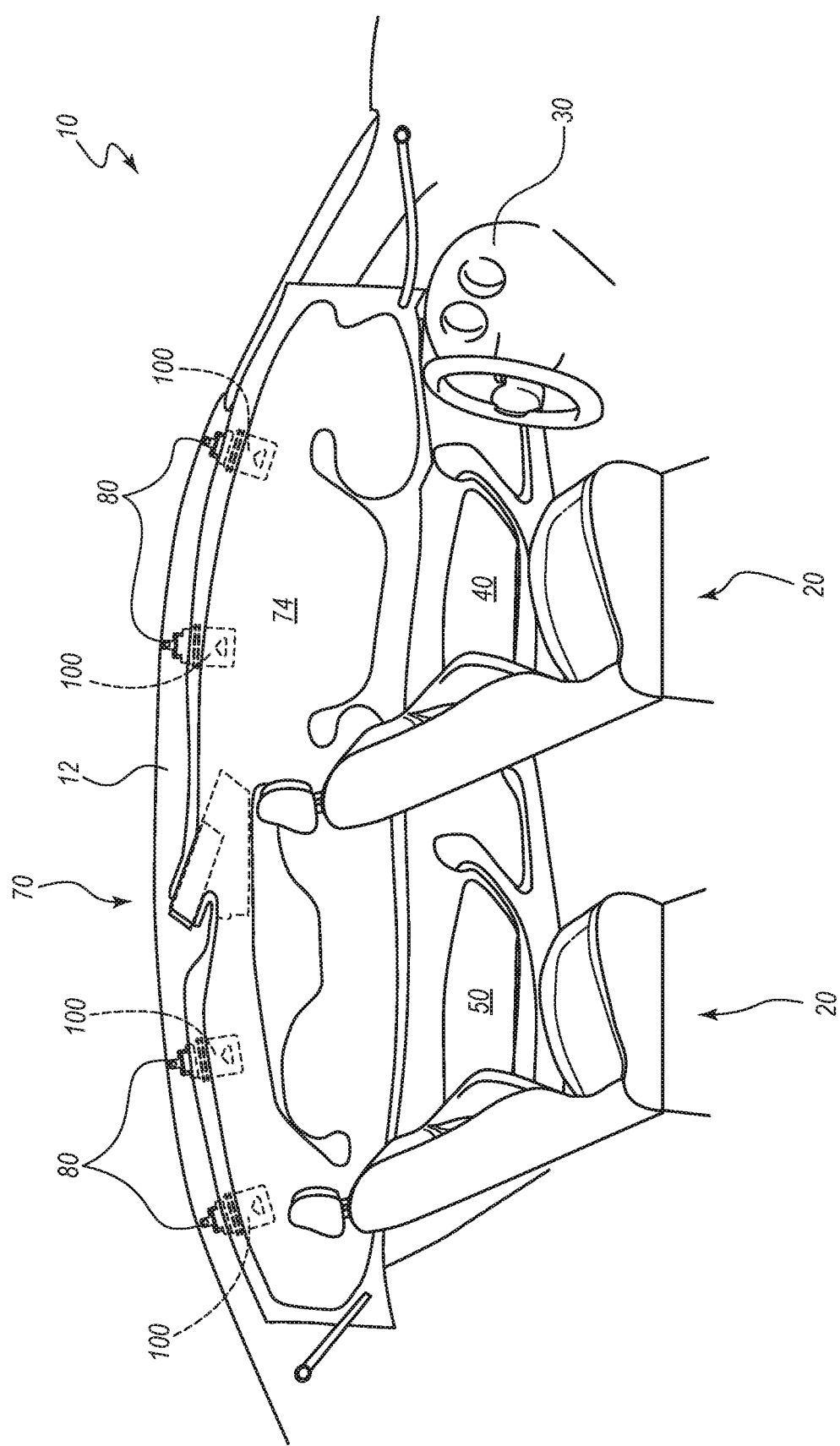
FIG. 1B is a side view of the inflatable side air curtain assembly of FIG. 1A in a deployed state.

FIG. 1B is a side view of the interior of the vehicle 10 having the inflatable side air curtain assembly 70 and brackets 80 of FIG. 1A, with the inflatable airbag curtain 74 in a deployed state. The vehicle occupant positions 20, instrument panel 30, front door 40, and rear door 50 are shown for reference. The brackets 80 can couple the side air curtain assembly 70 to at least a portion of the roof 12 of the vehicle 10. Each bracket 80 can include a mounting tab assembly 100. Each mounting tab assembly 100 can be coupled to a portion of the side air curtain assembly 70 or inflatable airbag curtain 74 and the respective bracket 80. The brackets 80 and mounting tab assemblies 100 may assist to dispose and configure the side air curtain assembly 70 and/or the inflatable airbag curtain 74 during a collision event. Moreover, an airbag (such as the inflatable airbag curtain 74) can be coupled or secured to a vehicle via a mounting tab assembly as provided herein (such as the mounting tab assembly 10.

Figure 2:
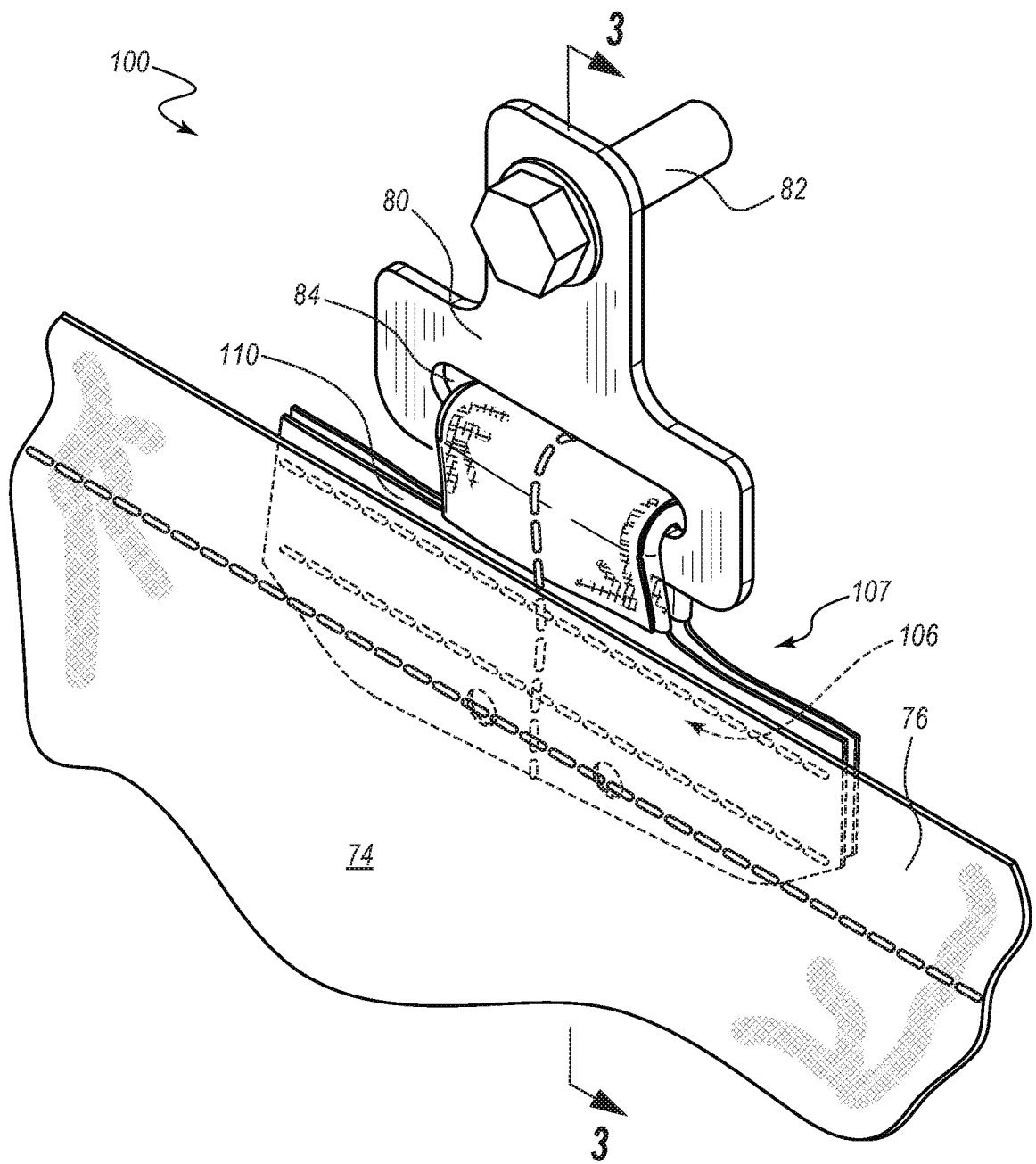
FIG. 2 is a perspective view of a mounting tab assembly, according to an embodiment of the present disclosure, with the mounting tab assembly coupled to an edge of an inflatable side airbag curtain.

FIG. 2 is a perspective view of a mounting tab assembly 100 with the mounting tab assembly 100 coupled to an edge 76 of the airbag curtain 74. The bracket 80 and a mounting bolt 82 are also shown. The bracket mounting bolt 82 may serve to couple the bracket 80 to the vehicle 10. The bracket 80 can include an aperture 84. A tab 110 of the mounting tab assembly 100 can loop through the aperture 84 of the bracket 80 and be coupled to the edge 76 of the airbag curtain 74. As shown, the tab 110 can include a first portion 106 and a second portion 107.

The mounting tab assembly 100 may reduce the volume of an airbag assembly when compacted and packaged for installation to a vehicle. More specifically. The tab 110 is configured to minimize or otherwise reduce the amount or quantity of material at a coupling point with the edge 76 of the airbag curtain 74, while providing ample material adjacent to and/or in contact with the metal bracket 80 to provide adequate reinforcement, for example to limit tearing, fraying, damage, or the like to the tab 110 by friction with the bracket 80 or any sharp or rough edges or surfaces on the bracket 80.

In FIG. 2, the tab 110 is positioned through the aperture 84 and folded according to a first orientation. As can be appreciated, in other embodiments the tab 110 may be positioned through the aperture 84 in an opposite orientation (e.g., rotated 180 degrees about an axis extending through the aperture 84) from that shown and then folded to couple to the edge 76 of airbag curtain 74 in the manner shown.

Figure 3B:
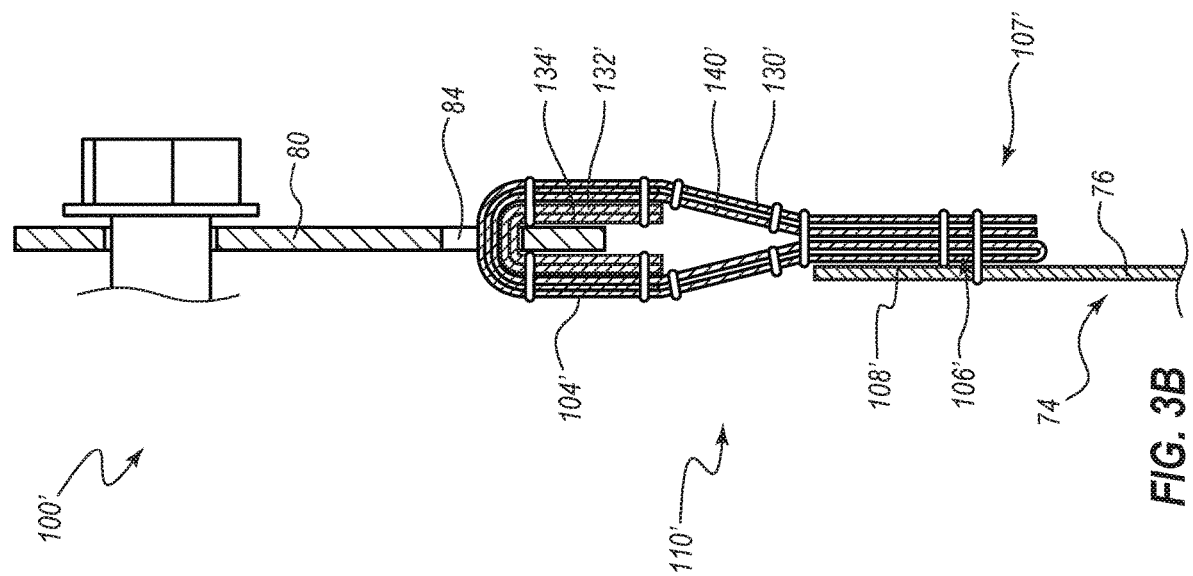
FIG. 3B is a partial cross-sectional view of a mounting tab assembly, according to another embodiment of the present disclosure.
Figure 3A:
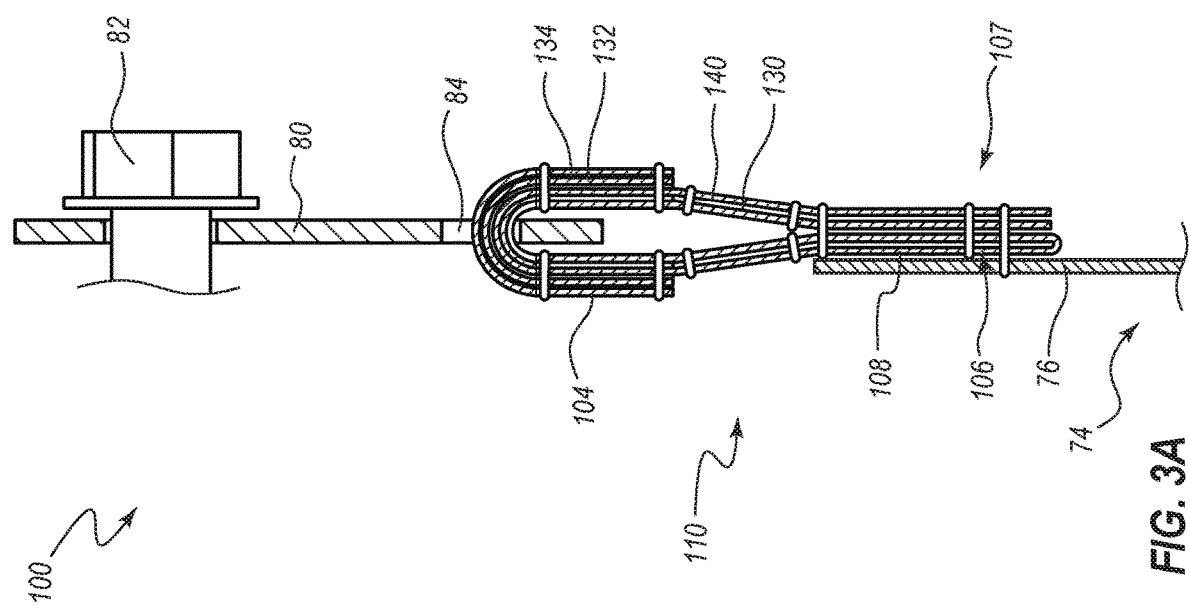
FIG. 3A is a partial cross-sectional view through line 3-3 of the mounting tab assembly of FIG. 2.

FIG. 3A is a partial cross-sectional view of the bracket 80 and mounting tab assembly 100 of FIG. 2 through line 3-3. The mounting tab assembly 100 can include the tab 110, a bracket receiving member 104, and an airbag coupling member 108. The tab 110 can loop or pass through the aperture 84 of the bracket 80. The bracket receiving member 104 of the tab 110 can couple the tab 110 to the bracket 80 (e.g., at the aperture 84). The airbag coupling member 108 couples at least a portion of the tab 110 to the edge 76 of the airbag curtain 74. More particularly, the first portion 106 and the second portion 107 can be coupled to a first side of the edge 76 of the airbag curtain 74. In various embodiments, the first portion 106 of the tab 110 can be coupled to a first side of the edge 76 of the airbag curtain 74, and the second portion 107 of the tab 110 can be coupled to a second side (e.g., an opposite side) of the edge 76 of the airbag curtain 74.

The tab 110, bracket receiving member 104, and airbag coupling member 108 can be formed from a single panel of material (as described in more detail below), which is folded and coupled to itself so as to form multiple layers of material. In some embodiments, the material may include a fabric, a polymer, or another suitable material. The panels as illustrated herein are generally depicted as being formed from a fabric. Panels, however, that are formed from other suitable materials are also within the scope of this disclosure. The panel may be coupled to itself by sewing, adhesive, welding (e.g., radio frequency welding), taping, or any other suitable means. The airbag coupling member 108, in the embodiment of FIG. 3A, can include four layers of fabric and may be coupled to the edge 76 of the airbag curtain 74. The four layers of fabric of the airbag coupling member 108 may provide a flexible coupling of the airbag curtain 74 to a vehicle so as to dispose and configure the side air curtain assembly 70 during a collision event.

The bracket 80 may be formed of metal or any other generally rigid material suitable for coupling the side air curtain assembly 70 to the vehicle. The bracket receiving member 104 of the tab 110, in the embodiment of FIG. 3A, can include four layers of fabric of the tab 110 looped through the aperture 84 of the bracket 80. The bracket receiving member 104 couples the tab 110 between the rigid bracket 80 and the airbag curtain 74. The airbag curtain 74 may move or flex in response to various forces during a collision event (e.g., in response to receiving a vehicle occupant). The movement of the airbag curtain 74 and the mounting tab assembly 100 can require a durable and resilient coupling between the airbag curtain 74 and the bracket 80. The four-layer configuration of the bracket receiving member 104 may provide a durable and resilient coupling between the rigid bracket 80 and the airbag curtain 74 so as to dispose and configure the side air curtain assembly 70 during a collision event.

With continued reference to FIG. 3A, the layers of the tab 110 are shown having a first panel (or zone) 130 adjacent to the edge 76 of the airbag curtain 74, then a second panel (or zone) 140, then a first arm (or protrusion) 132, and then a second arm (or protrusion) 134. These components are further described below.

FIG. 3B is a is a partial cross-sectional view of the bracket 80 and a mounting tab assembly 100' having an alternative order of layers in a tab 110'. Stated differently, the tab 110' of FIG. 3B may be disposed through the aperture 84 in an opposite orientation (e.g., rotated 180 degrees about an axis extending through the aperture 84) from that shown in FIG. 3A before being folded down to couple to the edge of the airbag curtain 74. In the embodiment of FIG. 3B, a first arm 132' is adjacent to the second panel 140' medially, or inwardly opposite from, the first panel 130', with a second arm 134' disposed adjacent to the first arm 132'. Tabs analogous to the tabs 110, 110' that are formed by yet other layer orders than those shown in FIGS. 3A and 3B are also within the scope of this disclosure.

As can be seen in FIGS. 3A and 3B, the tabs 110, 110' may reduce the volume of an airbag assembly when compacted and packaged for installation to a vehicle. More specifically, the tabs 110, 110' are configured to minimize or otherwise reduce the amount or quantity of material at a coupling point with the airbag curtain 74 (e.g., to allow a tighter roll or otherwise more compressed state of the airbag curtain 74), while providing more material adjacent to and/or in contact with the metal bracket 80 to provide adequate reinforcement, for example to limit tearing, fraying, damage, or the like to the tab 110, 110' as a result of friction with the bracket 80 or any sharp or rough edges or surfaces on the bracket 80.

FIG. 4A is a perspective view of an unassembled tab 110 of the mounting tab assembly 100 of FIG. 2, wherein the tab 110 has been cut or otherwise formed so as to be configured for assembly. The tab 110 of FIG. 4A is analogous to the tab 110'. Accordingly, the components and/or portions of the tab 110 may also be present in the tab 110'. For example, wherein the tab 110 can include a first panel 130, the following description and corresponding figures (e.g., FIGS. 4A-4E) may be read to indicate that the tab 110' also includes a first panel 130'. For clarity, only the numbering for the tab 110 will be used in the following description and corresponding figures.

In the embodiment of FIG. 4A, the tab 110 can include a first panel 130 extending from a first end 112 toward a second end 114 of the tab 110, and a second panel 140 extending from the second end 114 of the tab 110 toward the first panel 130, wherein the second panel 140 meets the first panel 130 at a foldable portion 118. For example, the foldable portion 118 may be disposed at a junction of the first and second panels 130, 140. Furthermore, a first arm 132 extends away from a central portion 116 of the first panel 130 in a first direction, and a second arm 134 extends away from the central portion 116 of the first panel 130 in a second direction opposite to the first direction and transverse or orthogonal to a longitudinal axis $A_{LONG}$. A first recess 146 extends inward from a first lateral edge 142 of the second panel 140, and a second recess 148 extends inward from a second lateral edge 144 of the second panel 140. The longitudinal axis $A_{LONG}$ is longitudinal to the tab 110 itself and not to the vehicle or any vehicle structure. The first panel 130, as illustrated, may substantially be the shape of a plus sign (+).

The tab 110 can be configured to be folded at the foldable portion 118 near a midline (fold axis 120) of the tab 110 transverse to the longitudinal axis $A_{LONG}$, such that the first end 112 is disposed adjacent the second end 114, wherein the first arm 132 and the second arm 134 are configured to fold through the first recess 146 and second recess 148, respectively, and around at least a portion of a central portion 116 of the second panel 140 to form the bracket receiving member 104. The fold axis 120 and the longitudinal axis $A_{LONG}$ are substantially perpendicular to one another.

In other words, each of the first and second panels 130, 140 includes a central portion 116, which may be a single central portion 116 which extends longitudinally along the tab 110 and through the foldable portion 118. The first panel 130 can include a pair of arms 132, 134, which extend in opposite directions from the central portion 116 of the first panel 130. Each of the first and second arms 132, 134 can include a first cut 136 along a first edge and a second cut 138 along a second edge. Each arm 132, 134 may be defined by the first cut 136 and the second cut 138. The dimension of each arm 132, 134 longitudinally, relative to the tab 110, is similar to the longitudinal dimension of each respective recess 146, 148. The second panel 140 can be substantially as wide laterally as are the arms 132, 134 of the first panel 130 and can include a pair of recesses 146, 148, which extend from the lateral edges 142, 144, respectively, inward toward the central portion 116 of the second panel 140.

The configuration of the recesses 146, 148 of the second panel 140 can form four "wings" 150, with two wings 150 disposed to either side of each recess 146, 148. Stated another way, each of the first and second recesses 146, 148 is disposed between two wings 150, and each of the wings 150 extends away from the central portion 116 of the second panel 140. The tab 110 is folded (as indicated by arrow $F_1$) along the fold axis 120 such that the first end 112 and second end 114 are adjacent each other, and the central portions 116 of the first panel 130 and second panel 140 substantially overlay each other.

Each panel 130, 140 may include one or more first apertures 160, and one or more second apertures 162, with the second apertures 162 laterally offset from the first apertures 160. The apertures 160, 162 may assist in assembly of the tab 110 by permitting or causing correct alignment of the first panel 130 and second panel 140 (e.g., when folded at or adjacent the fold axis 120). That is, aligning the first apertures 160 of the second panel 140 with the first apertures 160 of the first panel 130, and, similarly the second apertures 162 of the first and second panels 130, 140, may ensure that the first and second panels 130, 140 are properly aligned during assembly. Proper alignment of the panels 130, 140, when folded, may assist in achieving a desirable volume of the compacted, packaged inflatable side curtain assembly 70, as well as ensuring a desired strength (e.g., resistance to failure) of the mounting tab assembly 100.

The tab 110 may be formed from a single unitary fabric panel, including the first and second panels 130, 140. The tab 110 may be formed from the fabric panel such that the bias or weave 122 of the fabric is at an angle 124 relative to the longitudinal axis $A_{LONG}$. In the embodiment of FIG. 4A, the angle 124 of the bias 122 is disposed at about forty-five degrees (45°) relative to the longitudinal axis $A_{LONG}$, and to the fold axis 120. In various embodiments, the bias angle of the fabric panel to the longitudinal axis $A_{LONG}$ may be between about 15° and about 75°, between about 30° and about 60°, or between about 40° and about 50°. Other suitable bias angles 124 are also within the scope of this disclosure. The bias angle 124 may strengthen and/or reinforce the tab 110. For example, the bias angle 124 may strengthen and/or reinforce the tab 110 at the bracket receiving member 104. In other words, the bias angle 124 may aid in dissipating one or more forces transferred from the airbag curtain 74 to the bracket 80, and the bias angle 124 prevents or limits potential failure of the tab 110.

FIG. 4B is a perspective view of the tab 110 of FIG. 4A, with the tab 110 having been folded along the fold axis 120. With the first fold $F_1$ completed, the first end 112 and second end 114 are substantially disposed adjacent each other, as are the central portions 116 of the first panel 130 and second panel 140. The foldable portion 118 is disposed opposite (e.g., longitudinally) the first and second ends 112, 114. The first and second apertures 160, 162 of the first panel 130 substantially align with the corresponding first and second apertures 160, 162 of the second panel 140. The first arm 132 of the first panel 130 substantially aligns with the first recess 146 of the second panel 140. The shape of the first arm 132 substantially corresponds to the shape of the first recess 146, and the shape of the second arm 134 substantially corresponds to the shape of the second recess 148. In other words, the first arm 132 is the same size and shape, or substantially the same size and shape, as the first recess 146. The second arm 134, likewise, is the same size and shape as the second recess 148, or substantially the same size and shape as the second recess 148. The second arm 134 of the first panel 130 substantially aligns with the second recess 148 of the second panel 140. A second fold axis 122a is shown parallel to the longitudinal axis $A_{LONG}$ and positioned at or near the medial extent of the first recess 146. The first arm 132 is folded $F_2$ along the second fold axis 122a toward and onto at least a portion of the central portion 116 of the second panel 140.

FIG. 4C is a perspective view of the tab 110 of FIG. 4A after the second fold $F_2$ has been made. The first arm 132 of the first panel 130 overlies at least a portion of the central portion 116 of the second panel 140. A third fold axis 122b is shown substantially parallel to the longitudinal axis $A_{LONG}$ and positioned at or near the medial extent of the second recess 148 of the second panel 140. The second arm 134 of the first panel 130 is folded (see arrow $F_3$) toward and over at least a portion of the central portion 116 of the second panel 140 and onto at least a portion of the first arm 132.

FIG. 4D is a perspective view of the tab 110 of FIG. 4A after the third fold $F_3$ has been made. In some embodiments, along with each of the three folds $F_1$, $F_2$, $F_3$, a suitable adhesive may be applied to couple the second panel 140 to the first panel 130 and to couple the first arm 132 to the central portion 116 of the second panel 140 and/or to couple the second arm 134 to the first arm 132. Such adhesive, if applied, may be applied to the entire coupling surface of either or each component, or may be applied only in the area of the bracket receiving member 104.

FIG. 4E is a perspective view of the tab 110 of FIG. 4A after the three folds $F_1$, $F_2$, $F_3$ have been completed. A stitch or series of stitches 170 may extend along at least a portion of the tab 110 when the tab 110 is in a folded configuration. For example, the stitches 170 may extend along at least a portion of the bracket receiving member 104. In other words, a line of stitches 170 may be applied along or near the longitudinal axis $A_{LONG}$ to strengthen and/or couple together each of the fabric layers including the bracket receiving member 104. Once assembled, the tab 110 can include the bracket receiving member 104. The bracket receiving member 104 of the tab 110 can be disposed through the aperture 84 of a bracket 80 that is to be mounted or coupled to a vehicle structure to secure the tab 110 to the vehicle, and the first panel 130 and second panel 140 can be configured to be coupled to an airbag (not shown) to couple the airbag to the vehicle.

With the folds $F_1$, $F_2$, $F_3$ completed, the bracket receiving member 104 may include four layers of material to be disposed through an aperture of a bracket such that eight layers of material are disposed at the bracket receiving member 104 when the tab 110 is in a folded configuration. In other words, when the tab 110 is passed through the aperture of the bracket and folded so that the first and second panels 130, 140 are coupled to the airbag, the bracket receiving member 104 disposes eight layers of material at the aperture of the bracket.

Portions of the first and second panels 130, 140 at or adjacent to the foldable portion 118 may form the first portion 106 of the airbag coupling member (see the airbag coupling member 108 of FIG. 3A), while portions of the first and second panels 130, 140 at or adjacent to the first and second ends 112, 114, respectively, may form a second portion 107 of the airbag coupling member 108. The first and second portions 106, 107 of the airbag coupling member 108 are disposed adjacent each other when the tab 110 is in a folded configuration forming the airbag coupling member 108. This configuration disposes four layers of material at a central portion 116 of the airbag coupling member 108 (analogous to the central portion 116 of the first and second panels 130, 140), and the first aperture 160 extends through each of the four layers of material at the central portion 116. Similarly, the second aperture 162 extends through each of the four layers of material at the central portion 116. In other words, with the tab 110 folded, all four of the first apertures 160 can substantially align to form a contiguous first aperture 160 through all four layers of material, and all four of the second apertures 162 can substantially align to form a contiguous second aperture 162 through all four layers of material.

The tab 110 can form a two-layer thickness at the first and second portions 106, 107 of the airbag coupling member 108. The tab 110 also forms a four-layer thickness at the bracket receiving member 104. The two-layer thickness at the first and second portions 106, 107, and the four-layer thickness at the bracket receiving member 104 can provide greater resistance to tearing, rupturing, or failure under one or more forces that may be applied to the tab 110 during a collision event, as compared to mounting tabs having fewer layers, while providing for greater compaction of an inflatable airbag system into which the tab 110 may be incorporated (e.g., when the inflatable airbag is in a packaged state).

FIGS. 5A-5D depict an embodiment of a tab 510 that resembles the tab 110 described above in certain respects. Accordingly, like features are designated with like reference numerals, with the leading digits incremented to "5." For example, the embodiment depicted in FIG. 5A includes a first panel 530 that may, in some respects, resemble the first panel 130 of FIGS. 3A-4E. Relevant disclosure set forth above regarding similarly identified features thus may not be repeated hereafter. Moreover, specific features of the tab 110 and related components shown in FIGS. 3A-4E may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the tab 510 and related components depicted in FIG. 5A-5D. Any suitable combination of the features, and variations of the same, described with respect to the tab 110 and related components illustrated in FIGS. 3A-4E can be employed with the tab 510 and related components of FIGS. 5A-5D, and vice versa. This pattern of disclosure applies equally to further embodiments depicted in subsequent figures and described hereafter, wherein the leading digits may be further incremented.

FIG. 5A is a perspective view of the tab 510 in a preassembled state. The tab 510 can include the first panel 530 and a second panel 540. The first panel 530 can extend from a first end 512 of the tab 510 toward a second end 514 of the tab 510. The first panel 530 can include a central portion 516, a first arm 532, and a second arm 534. The first panel 530 can also include one or more first apertures 560 and one or more second apertures 562.

The second panel 540 of the tab 510 can extend from the second end 514 toward the first end 512 and to a foldable portion 518 where it meets the first panel 530. The second panel 540 can include a central portion 516, a first lateral edge 542, and a second lateral edge 544. The second panel 540 can be substantially as wide as the central portion 516.

The second panel 540 may include one or more first apertures 560 and one or more second apertures 562.

The tab 510 may be formed from a material (e.g., a fabric material). The fabric material can include a bias or weave 522. As shown in FIG. 5A, the angle 524 of the bias 522 may be about 45° relative to the longitudinal axis $A_{LONG}$ and relative to the fold axis 520. In other embodiments, the angle 524 of the bias 522 may be another suitable angle.

The tab 510 may be folded $F_1$ at the foldable portion 518 along the fold axis 520 so that the second panel 540 is substantially adjacent to and lies against at least a portion of the first panel 530, with the second end 514 substantially adjacent to the first end 512. With the tab 510 folded along the fold axis 520, the first apertures 560 of the first panel 530 and of the second panel 540 may be substantially aligned to each other. Similarly, the second apertures 562 of the first panel 530 may be substantially aligned with the second apertures 562 of the second panel 540.

FIG. 5B is an overhead plan view of the tab 510 of FIG. 5A with the first fold $F_1$ completed. As shown, the second panel 540 can substantially overlay the first panel 530. The first arm 532 of the first panel 530 can extend beyond the first lateral edge 542 of the second panel 540. The second arm 534 of the first panel 530 can extend beyond the second lateral edge 544 of the second panel 540. The second arm 534 can be folded (see arrow $F_2$) along the second lateral edge 544 toward and onto at least a portion of the central portion 516 of the second panel 540.

Figure 5D:
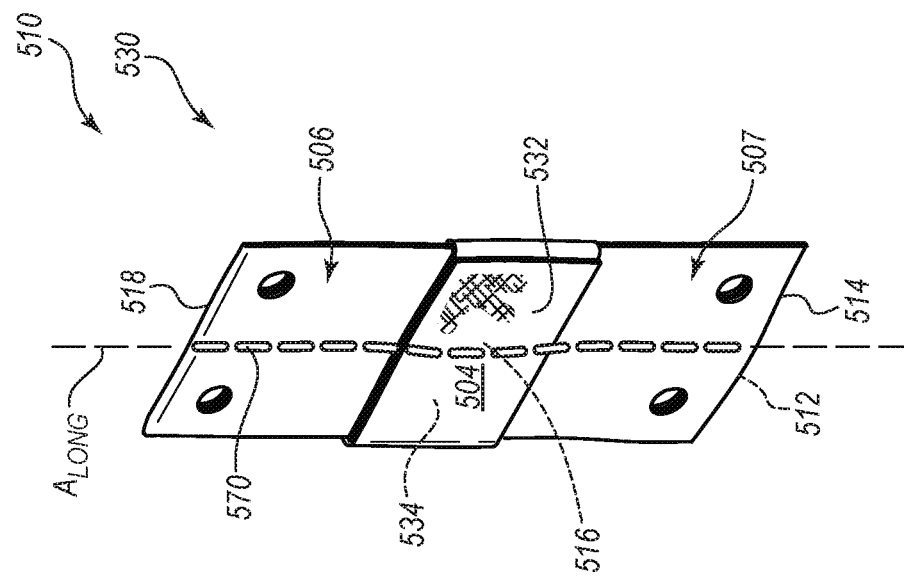
FIG. 5D is a perspective view of the tab of FIG. 5A with three folds completed.
Figure 5C:
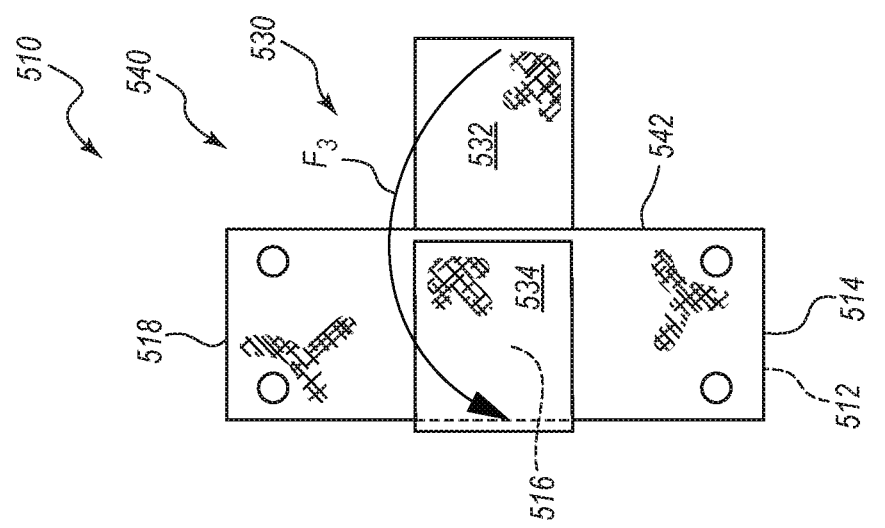
FIG. 5C is an overhead plan view of the tab of FIG. 5A with a second fold completed.

FIG. 5C is an overhead plan view of the tab 510, with the first and second folds $F_1$, $F_2$ completed. As illustrated, the second panel 540 can overlay at least a portion of the first panel 530. The second arm 534 can overlay at least a portion of the central portion 516 of the second panel 540. The first arm 532 can be folded (see arrow $F_3$) along the first lateral edge 542 toward and onto at least a portion of the second arm 534 such that the first arm 532 can also overlay at least a portion of the central portion 516 of the second panel 540.

FIG. 5D is a perspective view of the tab 510, with the three folds $F_1$, $F_2$, $F_3$ completed. With the three folds $F_1$, $F_2$, $F_3$ completed, the central portion 516 (analogous to the central portion 516 of the first and second panels 530, 540) of the tab 510 can include four fabric layers to form the bracket receiving member 504. A line of stitches 570 may be applied along or near the longitudinal axis $A_{LONG}$ to strengthen and/or couple together each of the fabric layers including the bracket receiving member 504. In addition to the four fabric layers of the bracket receiving member 504, two layers of fabric can form the first member 506 and second member 507 of the airbag receiving member (see, e.g., the airbag coupling member 108 of FIG. 3A).

FIG. 6A is an overhead plan view of a tab 610 in a preassembled state. The tab 610 can include a first panel 630 and a second panel 640. The first panel 630 can extend from the first end 612 toward the second end 614. The second panel 640 can extend from the second end 614 toward the first end 612 to meet the first panel 630 at the foldable portion 618. Each panel 630, 640 may include a central portion 616. The fabric material of the tab 610 can include a bias or weave 622 having a bias angle 624 of about 45° relative to the longitudinal axis $A_{LONG}$ and the fold axis 620. In other embodiments, the angle 624 of the bias 622 may be another suitable angle.

The first panel 630 can include one or more first apertures 660 and one or more second apertures 662. The first panel 630 can also include the first arm 632 and the second arm 634. The first and second arms 632, 634 can include a first cut 636 and a second cut 638 wherein the first and second cuts 636, 638 substantially arc toward each other at or adjacent the central portion 616 of the first panel 630. In other words, each arm 632, 634 can be at least partially defined by the first cut 636 and the second cut 638. In the embodiment of FIG. 6A, the first cut 636 may include an arc portion 637 located at or adjacent the central portion 616 of the first panel 630. The second cut 638 can include an arc portion 639 located at or adjacent the central portion 616 of the first panel 630. The arc portions 637, 639 of the cuts 636, 638 can approach each other at or adjacent the central portion 616 of the first panel 630.

The second panel 640 can include the first apertures 660 and second apertures 662, the central portion 616, and first and second lateral edges 642, 644. In the embodiment of FIG. 6A, the second panel 640 can be generally the same width as the central portions 616 of the first and second panels 630, 640. The second panel 640 can also include the first recess 646 in the first lateral edge 642 and the second recess 648 in the second lateral edge 644. The two recesses 646, 648 may be substantially U-shaped. A portion of the shape of the first arm 632 may substantially correspond to the shape of the first recess 646, and a portion of the shape of the second arm 634 may substantially correspond to the shape of the second recess 648. In other words, the medial portions of the first and second arms 632, 634 at the arc portions 637, 639 of the first and second cuts 636, 638 may generally comport to the shape of the first and second recesses 646, 648, respectively, of the first and second edges 642, 644 of the second panel 640.

The tab 610 may be folded (see arrow $F_1$) at the foldable portion 618 along the fold axis 620 such that the second panel 640 substantially overlies the first panel 630. When the tab 610 is folded (at arrow $F_1$), the first apertures 660 of the second panel 640 may substantially align with the first apertures 660 of the first panel 630 and the second apertures 662 of the second panel 640 may substantially align with the second apertures 662 of the first panel 630.

FIG. 6B is a top plan view of the tab 610 with the first fold $F_1$ completed. The second panel 640 overlies the first panel 630. The second arm 634 of the first panel 630 may be folded $F_2$ along the second recess 648 toward and onto at least a portion of the central portion 616 of the second panel 640.

Figure 6D:
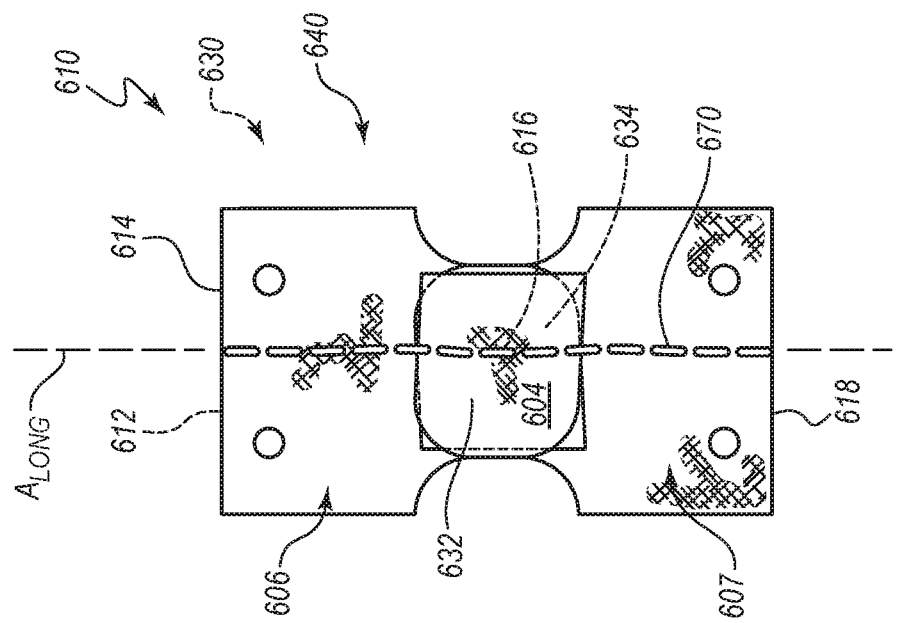
FIG. 6D is a top plan view of the tab of FIG. 6A with three folds completed.
Figure 6C:
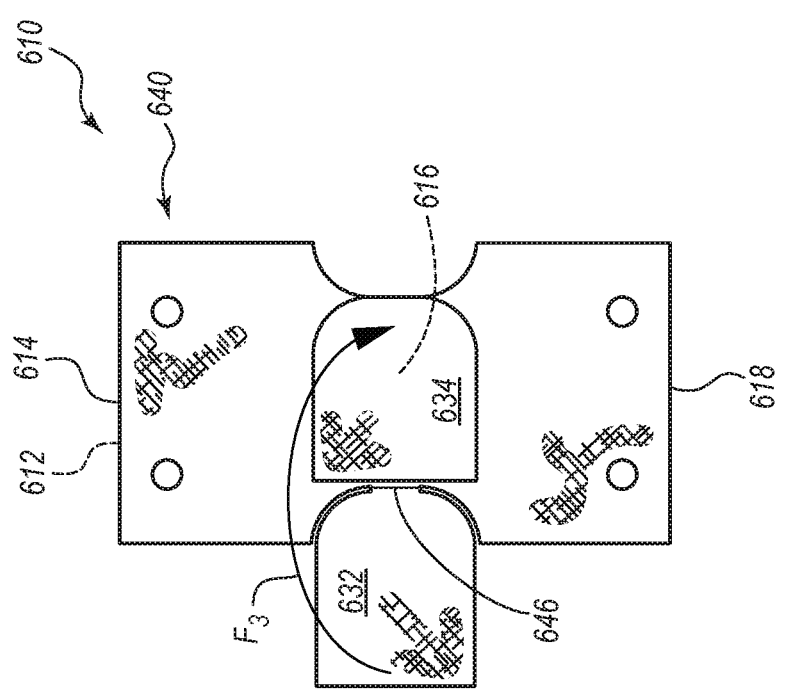
FIG. 6C is a top plan view of the tab of FIG. 6A with two folds completed.

FIG. 6C is a top plan view of the tab 610 with the first and second folds $F_1$, $F_2$ completed. The first arm 632 may be folded (see arrow $F_3$) at the first recess 646 of the second panel 640 toward and onto at least a portion of the second arm 634 such that the first arm 632 overlies at least a portion of both the second arm 634 and the central portion 616 of the second panel 640.

FIG. 6D is a top plan view of the tab 610 with the three folds $F_1$, $F_2$, $F_3$ completed. With the three folds $F_1$, $F_2$, $F_3$ completed, the first arm 632 overlies at least a portion of the second arm 634, which overlies at least a portion of the central portion 616 of the first and second panels 630, 640, such that four fabric layers (e.g., four combined layers of fabric) can form the bracket receiving member 604 of the tab 610. A line of stitches 670 may be applied at or adjacent the longitudinal axis $A_{LONG}$ to strengthen and/or couple together each of the fabric layers including the bracket receiving member 604. In addition to the four fabric layers of the bracket receiving member 604, two layers of fabric may form the first member 606 and second member 607 of the airbag receiving member (see, e.g., the airbag coupling member 108 of FIG. 3A).

FIG. 7A is a top plan view of a tab 710 in a preassembled state. The tab 710 can include a first panel 730 and a second panel 740. The fabric material of the tab 710 can include a bias or weave 722. As shown in FIG. 7A, a bias angle 724 of the bias 722 is about 45° relative to the longitudinal axis $A_{LONG}$ and relative to a fold axis 720. In other embodiments, the angle 724 of the bias 722 may be another suitable angle.

The first panel 730 extends from a first end 712 toward a second end 714. The first panel 730 can include a first arm 732 and a second arm 734. In the embodiment of FIG. 7A, the first panel 730 is substantially as wide as the first and second arms 732, 734. The first panel 730 can include a first lateral edge 742 and a second lateral edge 744. Each arm 732, 734 can be adjacent to two wings 750. The wings 750 may extend from a central portion 716 of the first panel 730 outward to the first and second lateral edges 742, 744, respectively. The first and second arms 732, 734 may each include a first and second cut 736, 738. Each first and second cut 736, 738 can include arc portions 737, 739. The first panel 730 can also include one or more first apertures 760 and one or more second apertures 762.

The second panel 740 of the tab 710 can extend from the second end 714 toward the first end 712 to meet the first panel 730 at a foldable portion 718. The second panel 740 may include the central portion 716 and first and second recesses 746, 748. In the embodiment of FIG. 7A, the second panel 740 is substantially as wide as the central portion 716. The shape of the first and second arms 732, 734 near the central portion 716 of the first panel 730 may generally comport to the shape of the recesses 746, 748 of the second panel 740. The second panel 740 can include first and second apertures 760, 762.

The second panel 740 may be folded (see arrow $F_1$) at the foldable portion 718 along the fold axis 720 such that the second panel 740 overlies the first panel 730, with the first apertures 760 of the second panel 740 substantially aligned to the first apertures 760 of the first panel 730, and the second apertures 762 of the second panel 740 substantially aligned to the second apertures 762 of the first panel 740.

FIG. 7B is a top plan view of the tab 710 with the first fold $F_1$ completed. The first arm 732 of the first panel may be folded (see arrow $F_2$) along the first recess 746 toward and onto the central portion 716 of the second panel 740.

Figure 7D:
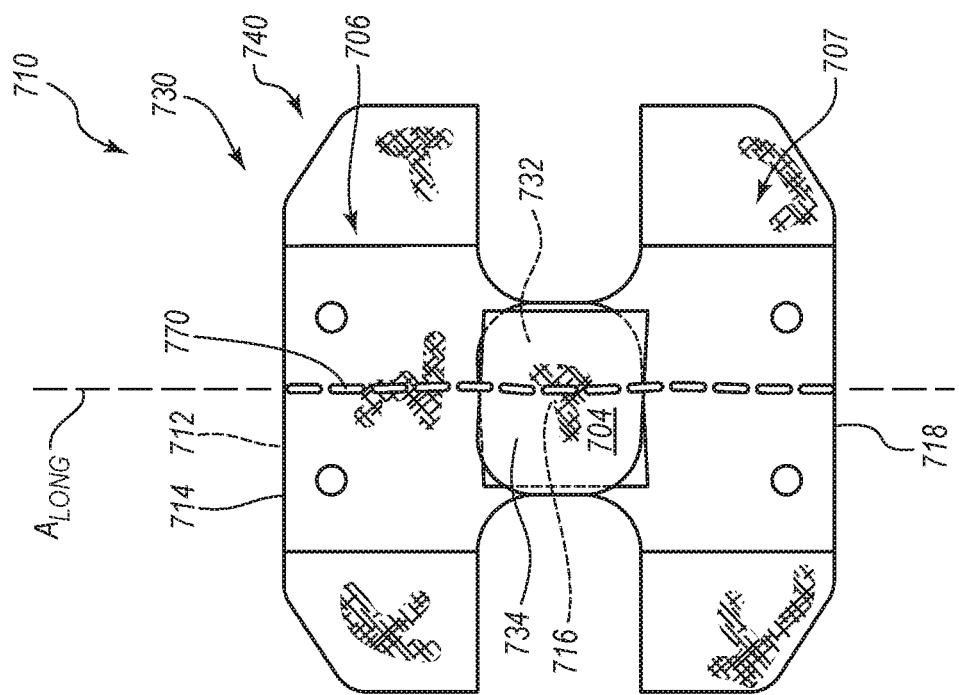
FIG. 7D is a top plan view of the tab of FIG. 7A with three folds completed.
Figure 7C:
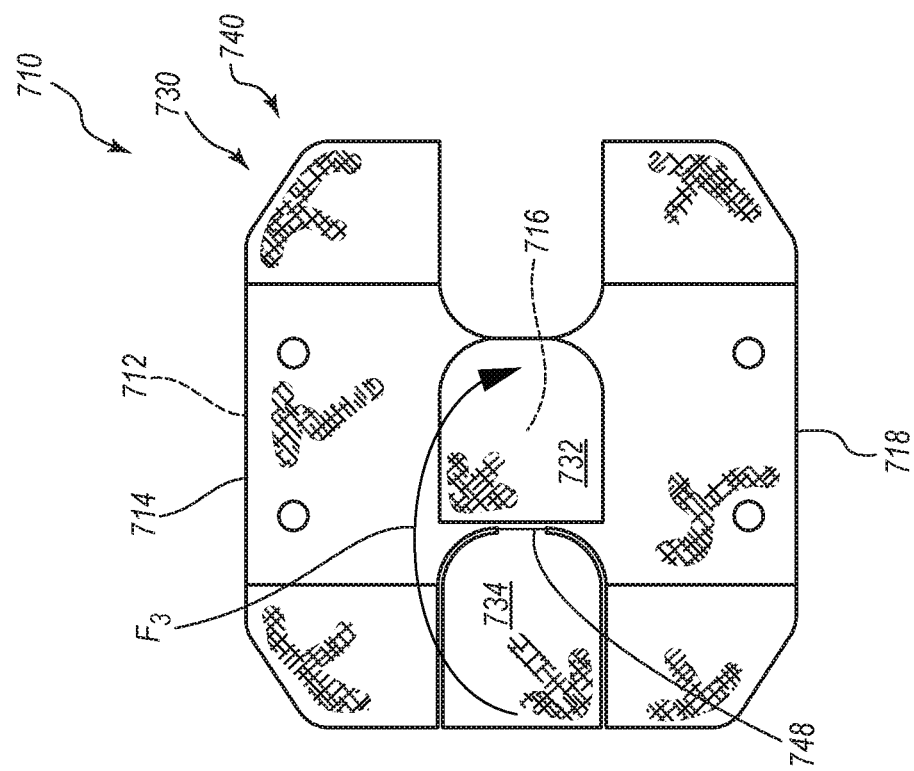
FIG. 7C is a top plan view of the tab of FIG. 7A with two folds completed.

FIG. 7C is a top plan view of the tab 710 with the two folds $F_1$, $F_2$ completed. The second arm 734 may be folded (see arrow $F_3$) along the second recess 748 toward and onto at least a portion of the first arm 732 such that the second arm 734 substantially overlies the first arm 732 and the central portion 716 of the first and second panels 730, 740. In FIG. 7C, the second arm 734 is shown folding to overlie the first arm 732 after the third fold $F_3$. In some embodiments, the folds $F_2$, $F_3$ may be exchanged such that the second arm 734 is folded second (e.g., after the fold $F_1$), and the first arm 732 is folded third resulting in the first arm 732 substantially overlying the second arm 734.

FIG. 7D is a top plan view of the tab 710 with the three folds $F_1$, $F_2$, $F_3$ completed. As shown, the second arm 734 substantially overlies the first arm 732 and the central portion 716 of the first and second panels 730, 740 to form the bracket receiving member 704. A line of stitches 770 may be applied to strengthen and/or couple together the four layers of fabric of the bracket receiving member 704. In addition to the four fabric layers of the bracket receiving member 704, two layers of fabric may form the first member 706 and second member 707 of the airbag receiving member (see, e.g., the airbag coupling member 108 of FIG. 3A).

FIG. 8A is a top plan view of a tab 810 in a preassembled state. In the embodiment of FIG. 8A, the first panel is integral with the second panel. In other words, the tab 810 consists of a single panel 830 incorporating features of, or similar to, the previously described first and second panels (130, 140, 530, 540, etc.). The panel 830 of the tab 810 can include a first end 812 and a second end 814, a first lateral edge 842 and a second lateral edge 844, a first arm 832 and a second arm 834, and first apertures 860 and second apertures 862. The first and second arms 832, 834 may be defined by first and second cuts 836, 838. The first and second cuts 836, 838 can include arc portions 837, 839. Two wings 850 may be disposed adjacent to each of the first and second arms 832, 834. The panel 830 may be formed form a fabric material. The fabric material of the panel 830 can include a bias or weave 822. In the embodiment of FIG. 8A, the bias 822 has an angle 824 of about 45° relative to the longitudinal axis $A_{LONG}$. Other suitable angles 824 are also within the scope of this disclosure. The first arm 832 may be folded $F_1$ along a fold axis 820a toward and onto at least a portion of the central portion 816 of the panel 830.

Figure 8C:
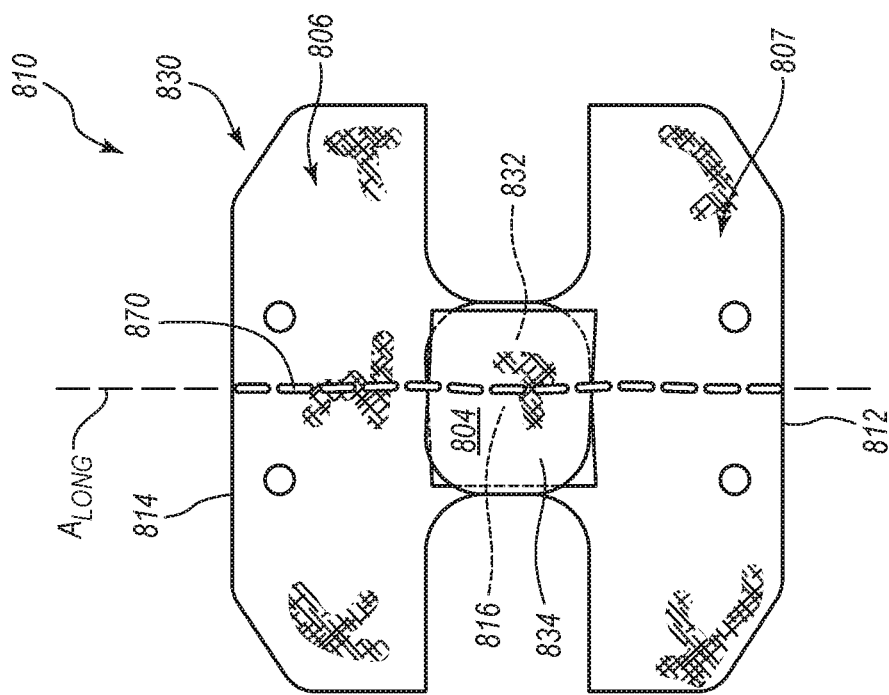
FIG. 8C is a top plan view of the tab of FIG. 8A with two folds completed.
Figure 8B:
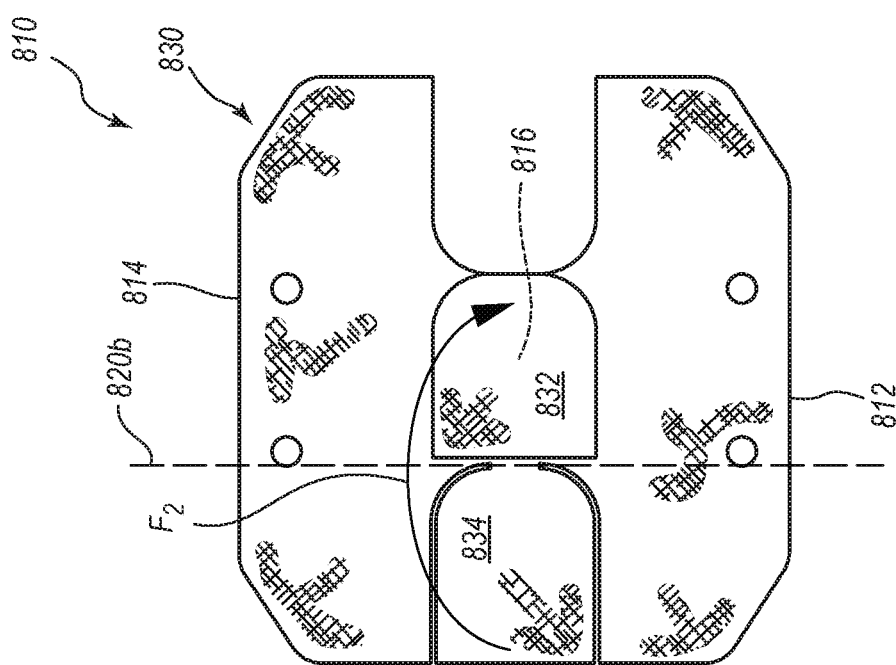
FIG. 8B is a top plan view of the tab of FIG. 8A with a first fold completed.

FIG. 8B is a top plan view of the tab 810 with the first fold $F_1$ completed. The first arm 832 substantially overlies the central portion 816 of the panel 830. The second arm 834 may be folded (see arrow $F_2$) at a fold axis 820b toward and onto at least a portion of the first arm 832 such that the second arm 834 substantially overlies the first arm 832 and the central portion 816 of the panel 830.

FIG. 8C is a top plan view of the tab 810 with the folds $F_1$, $F_2$ completed. The second arm 834 can substantially overlay the first arm 832 and the central portion 816 of the panel 830. A line of stitches 870 may be applied at or adjacent the longitudinal axis $A_{LONG}$ to strengthen and/or couple together each of the fabric layers including a bracket receiving member 804.

The embodiment of FIGS. 8A-8C may form a single layer at first and second portions 806, 807 of the airbag coupling member (see, e.g., the airbag coupling member 108 of FIG. 3A) and may form a three-layer bracket receiving member 804. The three-layer bracket receiving member 804 may provide increased resistance against tearing, rupturing, or failure under the one or more forces that may be applied to the tab 810 (e.g., during a collision event) as compared to mounting tabs having fewer layers, while providing for greater compaction of an inflatable airbag system into which the tab 810 may be incorporated (e.g., when the inflatable airbag is in a packaged state).

Throughout this specification, the phrase "coupled to" refers to any form of interaction between two or more entities, including mechanical, electrical, magnetic, electromagnetic, fluid, and thermal interaction. Two components may be coupled to each other even though they are not in direct contact with each other.

The terms "a" and "an" can be described as one, but not limited to one. For example, although the disclosure may recite a tab having "a line of stitches," the disclosure also contemplates that the tab can have two or more lines of stitches.

Unless otherwise stated, all ranges include both endpoints and all numbers between the endpoints.

The phrase "vehicle occupant position" refers to a position in which an occupant is generally positioned when seated in a seat of a vehicle. The term "occupant" refers to a person or crash test dummy within a vehicle.

Reference throughout this specification to "an embodiment" or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. § 112 ¶6. It will be apparent to those having reasonable skill in the art that changes may be made to the details of the above-described embodiments without departing from the underlying principles of the invention. Embodiments of the invention in which an exclusive property or privilege is claimed are defined as follows.

The invention claimed is:

1. A tab for securing an airbag to a vehicle, the tab comprising:
   a first panel extending from a first end of the tab toward a second end of the tab;
   a second panel extending from the second end of the tab toward the first panel, the second panel meeting the first panel at a foldable portion;
   a first arm extending away from a central portion of the first panel in a first direction, and a second arm extending away from the central portion of the first panel in a second direction, wherein the first direction is substantially opposite of the second direction;
   a first recess extending inward from a first lateral edge of the second panel, and a second recess extending inward from a second lateral edge of the second panel;
   wherein the tab is configured to be folded at the foldable portion such that the first end is disposed adjacent the second end, wherein the first arm and the second arm are configured to fold through the first recess and the second recess, respectively, and around a portion of the second panel to form a bracket receiving member; and
   wherein the bracket receiving member of the tab is to be disposed through an aperture of a bracket that is to be mounted on a vehicle structure to secure the tab to the vehicle, and wherein the first panel and the second panel are configured to be secured to the airbag to secure the airbag to the vehicle.

2. The tab of claim 1, wherein the bracket receiving member comprises four layers of material to be disposed through the aperture of the bracket, and wherein eight layers of material are disposed at the bracket receiving member when the tab is in a folded configuration.

3. The tab of claim 1, wherein portions of the first and second panels adjacent the foldable portion form a first portion of an airbag coupling member; wherein portions of the first and second panels adjacent the first and second ends, respectively, form a second portion of the airbag coupling member; wherein the first and second portions of the airbag coupling member are disposed adjacent each other when the tab is in a folded configuration forming the airbag coupling member; wherein four layers of material are disposed at a central portion of the airbag coupling member; and wherein a first aperture extends through each of the four layers of material at the central portion of the airbag coupling member.

4. The tab of claim 1, wherein a shape of the first arm corresponds to a shape of the first recess, and wherein a shape of the second arm corresponds to a shape of the second recess.

5. The tab of claim 1, wherein the first and second panels are formed from a fabric material.

6. The tab of claim 5, wherein a weave of the fabric material is disposed at an angle relative to a longitudinal axis of the foldable portion.

7. The tab of claim 1, wherein each of the first and second arms comprises a first cut along a first edge and a second cut along a second edge, and wherein the first and second cuts arc toward each other at the central portion of the first panel.

8. The tab of claim 1, wherein the first panel is integral with the second panel.

9. A tab for securing an airbag to a vehicle, the tab comprising:
a first panel extending from a first end toward a second end;
a second panel extending from the second end toward the first panel, the second panel meeting the first panel at a foldable portion;
a first arm extending away from a central portion of the first panel in a first direction, and a second arm extending away from the central portion of the first panel in a second direction, wherein the first direction is substantially opposite of the second direction;
wherein the tab is configured to be folded at the foldable portion such that the first end is disposed adjacent the second end, wherein the first arm and the second arm are configured to fold around a portion of the second panel to form a bracket receiving member to be disposed through an aperture of a bracket,
wherein when the tab is in a folded configuration, a first portion of the tab adjacent the foldable portion extends away from the bracket receiving member in a third direction forming a first portion of an airbag coupling member, and a second portion of the tab adjacent the first and second ends extends away from the bracket receiving member in a fourth direction forming a second portion of the airbag coupling member, and
wherein the first and second portions of the airbag coupling member are configured to be disposed adjacent each other in the folded configuration to form the airbag coupling member, wherein four layers of material are disposed at the airbag coupling member, and wherein a first aperture extends through each of the four layers of material at the airbag coupling member.

10. The tab of claim 9, wherein the first and second panels are formed from a fabric material.

11. The tab of claim 10, wherein a weave of the fabric material is disposed at an angle relative to a longitudinal axis of the foldable portion.

12. The tab of claim 9, wherein the first panel is integral with the second panel.

13. A tab for securing an airbag to a vehicle, the tab comprising:
a first panel extending between a first end and a second end in a first direction and between a first lateral edge and a second lateral edge in a second direction perpendicular to the first direction;
a first arm extending away from a central portion of the first panel to the first lateral edge, and a second arm extending away from the central portion of the first panel to the second lateral edge;
a second panel extending between a first end and a second end in a first direction and between a first lateral edge and a second lateral edge in a second direction perpendicular to the first direction, the first end of the second panel coupled to the second end of the first panel; and
a first recess extending inward from a first lateral edge of the second panel, and a second recess extending inward from a second lateral edge of the second panel,
wherein the first arm and the second arm are configured to fold around a portion of the first panel to form a bracket receiving member when the tab is in a folded configuration,
wherein the bracket receiving member of the tab is to be disposed through an aperture of a bracket that is to be mounted on a vehicle structure to secure the tab to the vehicle, and wherein the first panel is configured to be secured to the airbag to secure the airbag to the vehicle,
wherein the tab is further configured to be folded at a foldable portion disposed at a junction of the first and second panels such that the first panel is disposed adjacent the second panel, wherein the first arm and the second arm are further configured to fold through the first recess and the second recess, respectively, and around a portion of the second panel to form the bracket receiving member, and
wherein the first arm and the second arm are disposed a predetermined distance away from the foldable portion in the first direction.

14. The tab of claim 13, wherein four layers of material are disposed at the bracket receiving member when the tab is in the folded configuration.

15. The tab of claim 13, wherein when the tab is in the folded configuration, a portion of the first panel adjacent the first end forms a first portion of an airbag coupling member, and a portion of the first panel adjacent the second end forms a second portion of the airbag coupling member, and wherein the first and second portions of the airbag coupling member are configured to be disposed adjacent each other in the folded configuration to form the airbag coupling member such that two layers of material are disposed at the airbag coupling member.

16. The tab of claim 13, wherein the first and second arms each comprise a first cut along a first edge and a second cut along a second edge, and wherein the first and second cuts arc toward each other adjacent the central portion of the first panel.

17. The tab of claim 13, wherein eight layers of material are disposed at the bracket receiving member when the tab is in the folded configuration.

18. The tab of claim 13, wherein portions of the first and second panels adjacent the foldable portion form a first portion of an airbag coupling member; wherein portions of the first and second panels adjacent the second end of the first panel and the first end of the second panel, respectively, form a second portion of the airbag coupling member; wherein the first and second portions of the airbag coupling member are disposed adjacent each other when the tab is in the folded configuration forming the airbag coupling member; wherein four layers of material are disposed at the airbag coupling member; and wherein a first aperture extends through each of the four layers of material at the airbag coupling member.

\* \* \* \* \*